United States Patent
Balassanian et al.

(10) Patent No.: US 11,450,301 B2
(45) Date of Patent: Sep. 20, 2022

(54) MUSIC GENERATOR

(71) Applicant: AiMi Inc., Austin, TX (US)

(72) Inventors: Edward Balassanian, Austin, TX (US); Patrick Hutchings, Melbourne (AU)

(73) Assignee: AiMi Inc., Austin, TX (US)

( * ) Notice: Subject to any disclaimer, the term of this patent is extended or adjusted under 35 U.S.C. 154(b) by 152 days.

(21) Appl. No.: 16/894,153

(22) Filed: Jun. 5, 2020

(65) Prior Publication Data
US 2021/0027754 A1    Jan. 28, 2021

Related U.S. Application Data

(63) Continuation of application No. 16/420,456, filed on May 23, 2019, now Pat. No. 10,679,596.
(Continued)

(51) Int. Cl.
*G10H 1/00*     (2006.01)
*G06N 20/00*    (2019.01)
*G10H 1/02*     (2006.01)

(52) U.S. Cl.
CPC .......... *G10H 1/0025* (2013.01); *G06N 20/00* (2019.01); *G10H 1/02* (2013.01); *G10H 2210/125* (2013.01); *G10H 2240/131* (2013.01)

(58) Field of Classification Search
CPC .......... G10H 1/0025; G10H 2210/066; G10H 1/0008; G10H 2240/085; G10H 2240/131; G10H 2210/076; G10H 2240/305; G10H 2210/145; G10H 2210/111; G10H 2210/105; G10H 2240/325;
(Continued)

(56) References Cited

U.S. PATENT DOCUMENTS 6,297,439 B1    10/2001    Browne
6,506,969 B1    1/2003     Baron
(Continued)

FOREIGN PATENT DOCUMENTS

CN    109189974 A   *   1/2019
GB    2538994 A     *   12/2016   ........... G10H 1/0025
(Continued)

OTHER PUBLICATIONS

Yakov Vorobyev and Eric Coomes, "Beyond Beatmatching—Take your DJ Career to the Next Level," Mixed in Key LLC, 2012, 129 pages.
(Continued)

*Primary Examiner* — Marlon T Fletcher
(74) *Attorney, Agent, or Firm* — Kowert, Hood, Munyon, Rankin & Goetzel, P.C.; Michael B. Davis; Dean M. Munyon

(57) ABSTRACT

Techniques are disclosed relating to determining composition rules, based on existing music content, to automatically generate new music content. In some embodiments, a computer system accesses a set of music content and generates a set of composition rules based on analyzing combinations of multiple loops in the set of music content. In some embodiments, the system generates new music content by selecting loops from a set of loops and combining selected ones of the loops such that multiple ones of the loops overlap in time. In some embodiments, the selecting and combining loops is performed based on the set of composition rules and attributes of loops in the set of loops.

20 Claims, 13 Drawing Sheets

Related U.S. Application Data

(60) Provisional application No. 62/676,150, filed on May 24, 2018.

(58) Field of Classification Search
 CPC .............. G10H 2210/021; G10H 1/365; G10H 2210/031; G10H 2210/281; G10H 1/36; G10H 3/24; G10H 1/00
 See application file for complete search history.

(56) References Cited

U.S. PATENT DOCUMENTS

| | | | |
|---|---|---|---|
| 7,491,878 B2 | 2/2009 | Orr | |
| 8,115,090 B2 * | 2/2012 | Miyajima | G11B 27/034 84/625 |
| 8,751,030 B2 | 6/2014 | You et al. | |
| 8,812,144 B2 * | 8/2014 | Balassanian | G10H 1/0025 381/119 |
| 9,471,271 B2 | 10/2016 | Georges et al. | |
| 9,799,312 B1 * | 10/2017 | Cabral | G06N 5/04 |
| 10,964,299 B1 * | 3/2021 | Estes | G10H 1/0025 |
| 2005/0267819 A1 | 12/2005 | Kaplan | |
| 2008/0092721 A1 | 4/2008 | Schnepel et al. | |
| 2008/0314228 A1 | 12/2008 | Dreyfuss et al. | |
| 2009/0107320 A1 | 4/2009 | Willacy et al. | |
| 2009/0157203 A1 | 6/2009 | Bregar et al. | |
| 2009/0164034 A1 | 6/2009 | Cohen et al. | |
| 2009/0231968 A1 | 9/2009 | Ochi et al. | |
| 2010/0071535 A1 | 3/2010 | McKinney et al. | |
| 2010/0146583 A1 | 6/2010 | Prehofer et al. | |
| 2011/0054646 A1 | 3/2011 | Hernandez et al. | |
| 2012/0192701 A1 | 8/2012 | Watanabe et al. | |
| 2014/0052282 A1 * | 2/2014 | Balassanian | G06F 16/61 700/94 |
| 2014/0260909 A1 | 9/2014 | Matusiak | |
| 2016/0379611 A1 | 12/2016 | Georges et al. | |
| 2019/0362696 A1 * | 11/2019 | Balassanian | G10H 1/02 |
| 2021/0027754 A1 * | 1/2021 | Balassanian | G06F 16/68 |
| 2021/0110801 A1 * | 4/2021 | Estes | G10H 1/0025 |
| 2021/0110802 A1 * | 4/2021 | Estes | G10H 1/0025 |
| 2021/0248983 A1 * | 8/2021 | Balassanian | G05B 15/02 |

FOREIGN PATENT DOCUMENTS

| | | | |
|---|---|---|---|
| WO | 2017/087333 | 5/2017 | |
| WO | WO-2020121225 A1 * | 6/2020 | ............ G10H 1/0025 |
| WO | WO-2021064026 A1 * | 4/2021 | |
| WO | WO-2021168563 A1 * | 9/2021 | |

OTHER PUBLICATIONS

International Search Report and Written Opinion in Application No. PCT/US13/55445 dated Jan. 17, 2014, 9 pages.
International Search Report and Written Opinion in Application No. PCT/US2019/033686 dated Aug. 16, 2019, 26 pages.
Christopher Anderson et al., "The Generative Electronic Dance Music Algorithmic System (GEDMAS)," Musical Metacreation: Papers from the 2013 AIIDE Workshop (WS-13-22), pp. 5-8.
Andrew R. Brown et al., "Adaptive Music Techniques," Improvise: The Australasian Computer Music Conference, pp. 26-31.
Carlos Castellanos, et al. "Biometric Tendency Recognition and Classification System: An Artistic Approach," Conference Paper, Sep. 2008, 8 pages.
Nick Collins, "INFNO: Generating Synth Pop and Electronic Dance Music On Demand," International Computer Music Conference, ICMC Aug. 2008, 4 pages.
Arne Eigenfeldt et al., "Evolving Structures for Electronic Dance Music," Genetic and Evolutionary Computation Conference (GECCO), Jul. 2013, 8 pages.
Toby Gifford, "Tuning Into the Task: Sonic Environmental Cues and Mental Task Switching," The 22nd International Conference on Auditory Display (ICAD-2016), Jul. 2-8, 2016, 6 pages.
Jon McCormack et al., "In a Silent Way: Communication Between AI and Improvising Musicians Beyond Sound," Proceedings of the 2019 CHI Conference on Human Factors in Computing Systems; Paper No. 38, May 4-9, 2019, 11 pages.
Steven R. Livingstone et al., "Dynamic Response: Real-Time Adaptation for Music Emotion," Australasian conference on Interactive Entertainment, 11, 2005, 7 pages.
Steven R. Livingstone et al., "Controlling musical emotionality: an affective computational architecture for influencing musical emotions," Digital Creativity, 2007, vol. 18, No. 1, pp. 43-53.
Aengus Martin et al., "Implementation of a Real-Time Musical Decision-Maker," ACMC 2012 Conference Proceedings, pp. 44-50.
Jack Stockholm et al., "Reinforcement Learning of Listener Response for Mood Classification of Audio," 12th IEEE International Conference on Computational Science and Engineering, Aug. 29-31, 2009, 5 pages.
International Preliminary Report in PCT Appl. No. PCT/US2019/033686 dated Aug. 18, 2020, 14 pages.

* cited by examiner

MUSIC GENERATOR

This application is a continuation of U.S. application Ser. No. 16/420,456, filed May 23, 2019 (now U.S. Pat. No. 10,679,596), which claims the benefit of U.S. Provisional Application No. 62/676,150, filed on May 24, 2018, which is incorporated by reference herein in its entirety.

BACKGROUND

Technical Field

This disclosure relates to audio engineering and more particularly to generating music content.

Description of the Related Art

Streaming music services typically provide songs to users via the Internet. Users may subscribe to these services and stream music through a web browser or application. Examples of such services include PANDORA, SPOTIFY, GROOVESHARK, etc. Often, a user can select a genre of music or specific artists to stream. Users can typically rate songs (e.g., using a star rating or a like/dislike system), and some music services may tailor which songs are streamed to a user based on previous ratings. The cost of running a streaming service (which may include paying royalties for each streamed song) is typically covered by user subscription costs and/or advertisements played between songs.

Song selection may be limited by licensing agreements and the number of songs written for a particular genre. Users may become tired of hearing the same songs in a particular genre. Further, these services may not tune music to users' tastes, environment, behavior, etc.

Figure 1:
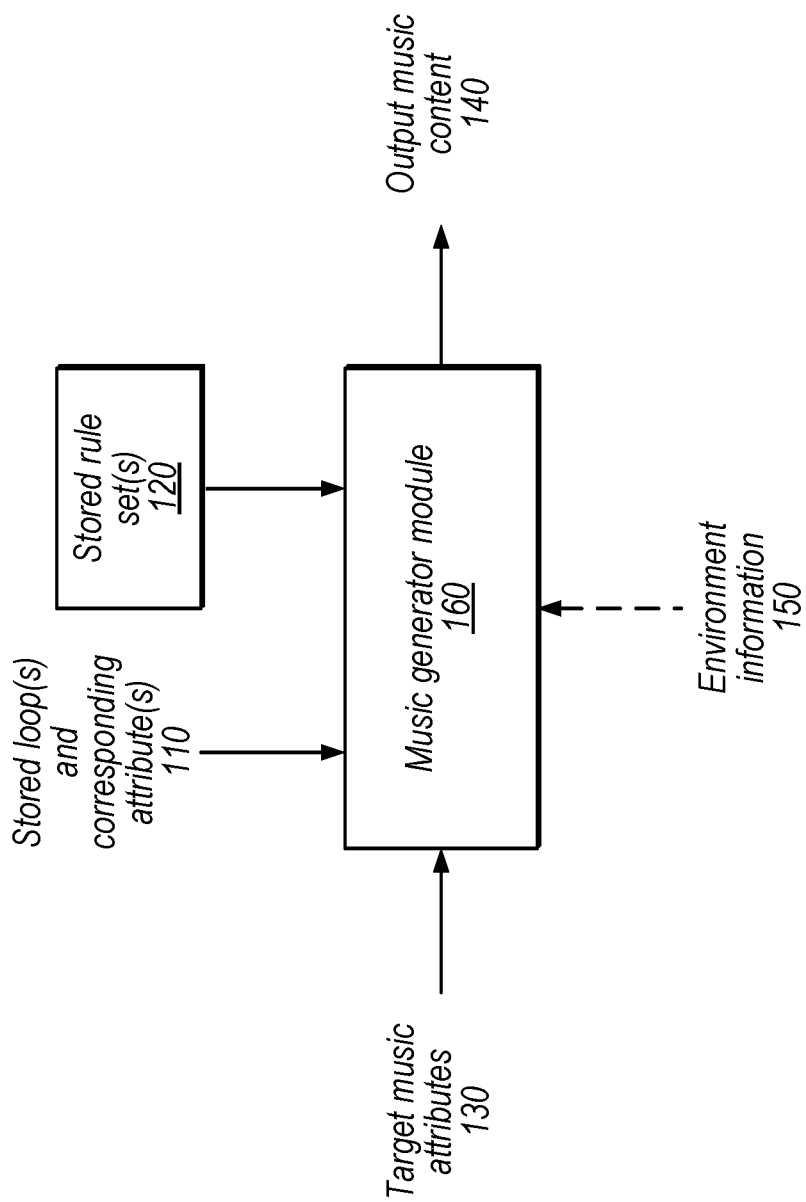
FIG. 1 is a diagram illustrating an exemplary music generator module that generates music content based on multiple different types of inputs, according to some embodiments.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]— is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "resource negotiator module configured to generate a predicted queue map" is intended to cover, for example, a module that performs this function during operation, even if the corresponding device is not currently being used (e.g., when its battery is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed mobile computing device, for example, would not be considered to be "configured to" perform some specific function, although it may be "configurable to" perform that function. After appropriate programming, the mobile computing device may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

DETAILED DESCRIPTION

U.S. patent application Ser. No. 13/969,372, filed Aug. 16, 2013 (now U.S. Pat. No. 8,812,144), which is incorporated by reference herein in its entirety, discusses techniques for generating music content based on one or more musical attributes. To the extent that any interpretation is made based on a perceived conflict between definitions of '372 application and the remainder of the disclosure, the present disclosure is intended to be govern. The musical attributes may be input by a user or may be determined based on environment information such as ambient noise, lighting, etc. The '372 disclosure discusses techniques for selecting stored loops and/or tracks or generating new loops/tracks, and layering selected loops/tracks to generate output music content.

The present disclosure generally relates to systems for generating custom music content. The target music attributes may be declarative, such that users specify one or more goals for music to be generated and the rules engine selects and combines loops to achieve those goals. The system may also modify loops, e.g., by cutting to use only a portion of a loop or applying audio filter(s) to change sound for a loop. The various techniques discussed below may provide more relevant custom music for different contexts, facilitate generating music according to a particular sound, allow users more control of how music is generated, generate music that achieves one or more specific goals, generate music in real-time to accompany other content, etc.

In some embodiments, computer learning is used to generate "grammar" (e.g., a rule set) for a particular artist or type of music. For example, prior compositions may be used to determine a set of rules to achieve target music attributes using the style of an artist. This rule set may then be used to automatically generate custom music in that artist's style. Note that a rule set may include explicit user-understandable rules such as "combine these types of loops together to achieve the sound of a particular artist" or may be encoded in other ways, e.g., as parameters for a machine learning engine that implements composition rules internally, where the rules may not be accessible to users. In some embodiments, the rules are probabilistic, as discussed in further detail below.

In some embodiments, a music generator may be implemented using multiple different rule sets for different types of loops. For example, sets of loops may be stored corresponding to particular instruments (e.g., drum loops, bass loops, melody loops, rhythm guitar loops, etc.). Each rule set may then evaluate which loops of its corresponding set to select, and when to join in with the other rule sets in the overall composition. Further, a master rule set may be used to coordinate outputs of the individual rule sets.

In some embodiments, a rules engine is used to generate music based on video and/or audio data. For example, the music generator may automatically generate a soundtrack for a film, even while the film is being played. Further, different scores may be provided to different listeners, e.g., based on culture, language, demographic, etc. In some embodiments, the music generator may use environmental feedback to adjust a rule set in real-time, e.g., to attain desired emotions in an audience. In this manner, the rule set may be tuned to achieve certain environmental goals.

Figure 2:
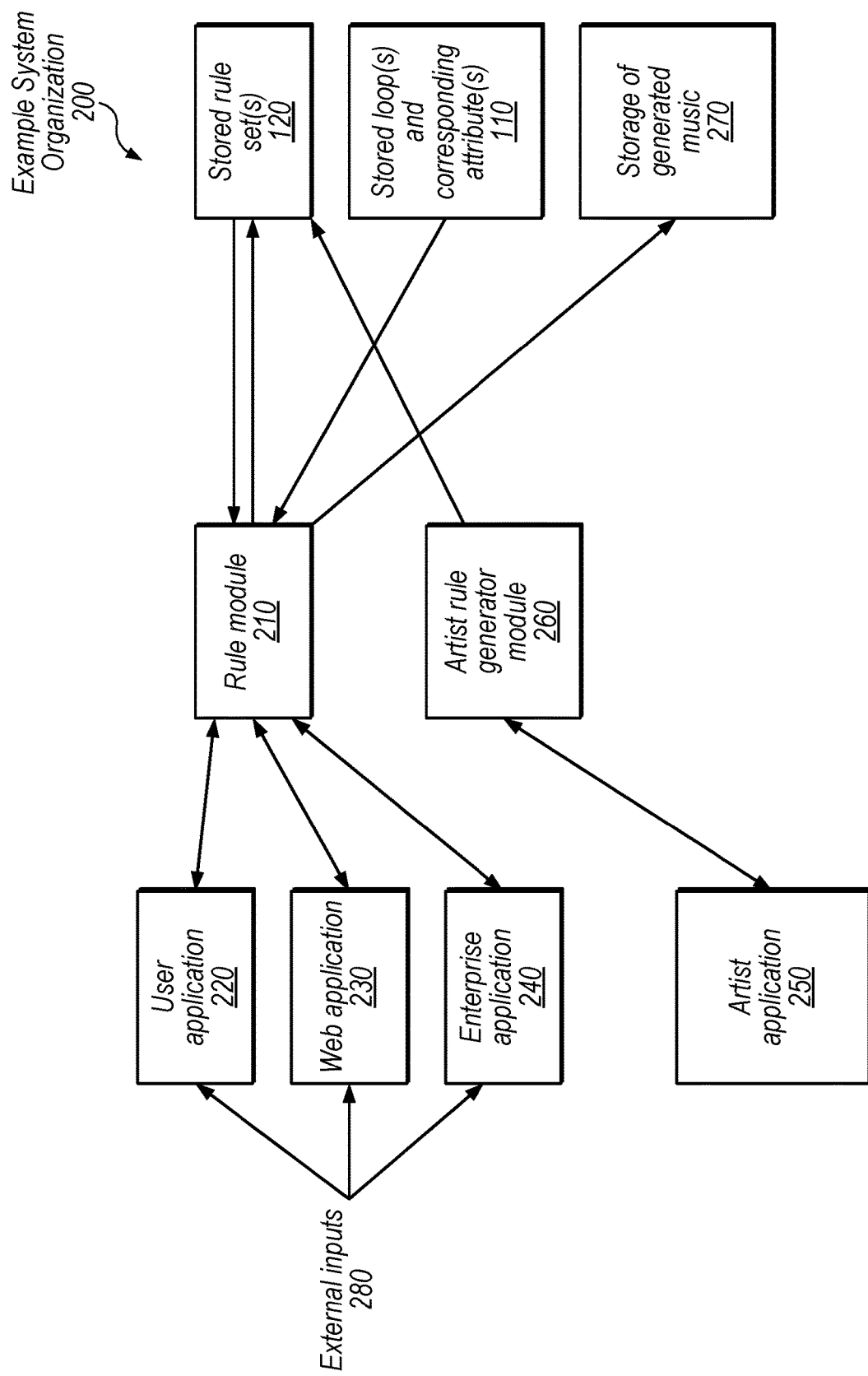
FIG. 2 is a block diagram illustrating an exemplary overview of a system with multiple applications for user interaction to generate output music content, according to some embodiments.

This disclosure initially describes, with reference to FIGS. 1 and 2, an example music generator module and an overall system organization with multiple applications. Techniques for generating a rule set for a particular artist or music style are discussed with reference to FIGS. 3 and 4. Techniques for using different rule sets for different sets of loops (e.g., instruments) are discussed with reference to FIGS. 5 and 6A-6B. Techniques for generating music based on video data are discussed with reference to FIGS. 7 and 8. FIGS. 9A-9B show exemplary application interfaces.

Generally speaking, the disclosed music generator includes loop data, metadata (e.g., information describing the loops), and a grammar for combining loops based on the metadata. The generator may create music experiences using rules to identify the loops based on metadata and target characteristics of the music experience. It may be configured to expand the set of experiences it can create by adding or modifying rules, loops, and/or metadata. The adjustments may be performed manually (e.g., artists adding new metadata) or the music generator may augment the rules/loops/metadata as it monitors the music experience within the given environment and goals/characteristics desired. For example, if the music generator watches a crowd and sees that people are smiling it can augment its rules and/or metadata to note that certain loop combinations cause people to smile. Similarly, if cash register sales increase, the rule generator can use that feedback to augment the rules/metadata for the associated loops that are correlated with the increase in sales.

As used herein, the term "loop" refers to sound information for a single instrument over a particular time interval. Loops may be played in a repeated manner (e.g., a 30 second loop may be played four times in a row to generate 2 minutes of music content), but loops may also be played once, e.g., without being repeated. Various techniques discussed with reference to loops may also be performed using audio files that include multiple instruments.

Overview of Exemplary Music Generator

FIG. 1 is a diagram illustrating an exemplary music generator, according to some embodiments. In the illustrated embodiment, music generator module 160 receives various information from multiple different sources and generates output music content 140.

In the illustrated embodiment, module 160 accesses stored loop(s) and corresponding attribute(s) 110 for the stored loop(s) and combines the loops to generate output music content 140. In particular, music generator module 160 selects loops based on their attributes and combines loops based on target music attributes 130 and/or environment information 150. In some embodiments, environment information is used indirectly to determine target music attributes 130. In some embodiments, target music attributes 130 are explicitly specified by a user, e.g., by specifying a desired energy level, mood, multiple parameters, etc. Examples of target music attributes 130 include energy, complexity, and variety, for example, although more specific attributes (e.g., corresponding to the attributes of the stored tracks) may also be specified. Speaking generally, when higher-level target music attributes are specified, lower-level specific music attributes may be determined by the system before generating output music content.

Complexity may refer to a number of loops and/or instruments that are included in a composition. Energy may be related to the other attributes or may be orthogonal to the other attributes. For example, changing keys or tempo may affect energy. However, for a given tempo and key, energy may be changed by adjusting instrument types (e.g., by adding high hats or white noise), complexity, volume, etc. Variety may refer to an amount of change in generated music over time. Variety may be generated for a static set of other musical attributes (e.g., by selecting different tracks for a given tempo and key) or may be generated by changing musical attributes over time (e.g., by changing tempos and keys more often when greater variety is desired). In some embodiments, the target music attributes may be thought of as existing in a multi-dimensional space and music generator module 160 may slowly move through that space, e.g., with course corrections, if needed, based on environmental changes and/or user input.

In some embodiments, the attributes stored with the loops contain information about one or more loops including: tempo, volume, energy, variety, spectrum, envelope, modulation, periodicity, rise and decay time, noise, artist, instrument, theme, etc. Note that, in some embodiments, loops are partitioned such that a set of one or more loops is specific to a particular loop type (e.g., one instrument or one type of instrument).

In the illustrated embodiment, module 160 accesses stored rule set(s) 120. Stored rule set(s) 120, in some embodiments, specify rules for how many loops to overlay such that they are played at the same time (which may correspond to the complexity of the output music), which major/minor key progressions to use when transitioning between loops or musical phrases, which instruments to be used together (e.g., instruments with an affinity for one another), etc. to achieve the target music attributes. Said another way, the music generator module 160 uses stored rule set(s) 120 to achieve one or more declarative goals defined by the target music attributes (and/or target environment information. In some embodiments, music generator module 160 includes one or more pseudo-random number generators configured to introduce pseudo-randomness to avoid repetitive output music.

Environment information 150, in some embodiments, includes one or more of: lighting information, ambient noise, user information (facial expressions, body posture, activity level, movement, skin temperature, performance of certain activities, clothing types, etc.), temperature information, purchase activity in an area, time of day, day of the week, time of year, number of people present, weather status, etc. In some embodiments, music generator module 160 does not receive/process environment information. In some embodiments, environment information 130 is received by another module that determines target music attributes 130 based on the environment information. Target music attributes 130 may also be derived based on other types of content, e.g., video data. In some embodiments, environment information is used to adjust one or more stored rule set(s) 120, e.g., to achieve one or more environment goals. Similarly, the music generator may use environment information to adjust stored attributes for one or more loops, e.g., to indicate target musical attributes or target audience characteristics for which those loops are particularly relevant.

As used herein, the term "module" refers to circuitry configured to perform specified operations or to physical non-transitory computer readable media that store information (e.g., program instructions) that instructs other circuitry (e.g., a processor) to perform specified operations. Modules may be implemented in multiple ways, including as a hardwired circuit or as a memory having program instructions stored therein that are executable by one or more processors to perform the operations. A hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

As used herein, the phrase "music content" refers both to music itself (the audible representation of music), as well as to information usable to play music. Thus, a song recorded as a file on a storage medium (such as, without limitation a compact disc, flash drive, etc.) is an example of music content; the sounds produced by outputting this recorded file or other electronic representation (e.g., through speakers) is also an example of music content.

The term "music" includes its well-understood meaning, including sounds generated by musical instruments as well as vocal sounds. Thus, music includes, for example, instrumental performances or recordings, a cappella performances or recordings, and performances or recordings that include both instruments and voice. One of ordinary skill in the art would recognize that "music" does not encompass all vocal recordings. Works that do not include musical attributes such as rhythm or rhyme—for example, speeches, newscasts, and audiobooks—are not music.

One piece of music "content" can be distinguished from another piece of music content in any suitable fashion. For example, a digital file corresponding to a first song may represent a first piece of music content, while a digital file corresponding to a second song may represent a second piece of music content. The phrase "music content" can also be used to distinguish particular intervals within a given musical work, such that different portions of the same song can be considered different pieces of musical content. Similarly, different tracks (e.g., piano track, guitar track) within a given musical work may also correspond to different pieces of musical content. In the context of a potentially endless stream of generated music, the phrase "music content" can be used to refer to some portion of the stream (e.g., a few measures or a few minutes).

Music content generated by embodiments of the present disclosure may be "new music content"—combinations of musical elements that have never been previously generated. A related (but more expansive) concept—"original music content"—is described further below. To facilitate the explanation of this term, the concept of a "controlling entity" relative to an instance of music content generation is described. Unlike the phrase "original music content," the phrase "new music content" does not refer to the concept of a controlling entity. Accordingly, new music content refers to music content that has never before been generated by any entity or computer system.

Conceptually, the present disclosure refers to some "entity" as controlling a particular instance of computer-generated music content. Such an entity owns any legal rights (e.g., copyright) that might correspond to the computer-generated content (to the extent that any such rights may actually exist). In one embodiment, an individual that creates (e.g., codes various software routines) a computer-implemented music generator or operates (e.g., supplies inputs to) a particular instance of computer-implemented music generation will be the controlling entity. In other embodiments, a computer-implemented music generator may be created by a legal entity (e.g., a corporation or other business organization), such as in the form of a software product, computer system, or computing device. In some instances, such a computer-implemented music generator may be deployed to many clients. Depending on the terms of a license associated with the distribution of this music generator, the controlling entity may be the creator, the distributor, or the clients in various instances. If there are no such explicit legal agreements, the controlling entity for a computer-implemented music generator is the entity facilitating (e.g., supplying inputs to and thereby operating) a particular instance of computer generation of music content.

Within the meaning of the present disclosure, computer generation of "original music content" by a controlling entity refers to 1) a combination of musical elements that has never been generated before, either by the controlling entity or anyone else, and 2) a combination of musical elements that has been generated before, but was generated in the first instance by the controlling entity. Content type 1) is referred to herein as "novel music content," and is similar to the definition of "new music content," except that the definition of "novel music content" refers to the concept of a "controlling entity," while the definition of "new music content" does not. Content type 2), on the other hand, is referred to herein as "proprietary music content." Note that the term "proprietary" in this context does not refer to any implied legal rights in the content (although such rights may exist), but is merely used to indicate that the music content was originally generated by the controlling entity. Accordingly, a controlling entity "re-generating" music content that was previously and originally generated by the controlling entity constitutes "generation of original music content" within the present disclosure. "Non-original music content" with respect to a particular controlling entity is music content that is not "original music content" for that controlling entity.

Some pieces of music content may include musical components from one or more other pieces of music content. Creating music content in this manner is referred to as "sampling" music content, and is common in certain musical works, and particularly in certain musical genres. Such music content is referred to herein as "music content with sampled components," "derivative music content," or using other similar terms. In contrast, music content that does not include sampled components is referred to herein as "music content without sampled components," "non-derivative music content," or using other similar terms.

In applying these terms, it is noted that if any particular music content is reduced to a sufficient level of granularity, an argument could be made that this music content is derivative (meaning, in effect, that all music content is derivative). The terms "derivative" and "non-derivative" are not used in this sense in the present disclosure. With regard to the computer generation of music content, such computer generation is said to be derivative (and result in derivative music content) if the computer generation selects portions of components from pre-existing music content of an entity other than the controlling entity (e.g., the computer program selects a particular portion of an audio file of a popular artist's work for inclusion in a piece of music content being generated). On the other hand, computer generation of music content is said to be non-derivative (and result in non-derivative music content) if the computer generation does not utilize such components of such pre-existing content. Note some pieces of "original music content" may be derivative music content, while some pieces may be non-derivative music content.

It is noted that the term "derivative" is intended to have a broader meaning within the present disclosure than the term "derivative work" that is used in U.S. copyright law. For example, derivative music content may or may not be a derivative work under U.S. copyright law. The term "derivative" in the present disclosure is not intended to convey a negative connotation; it is merely used to connote whether a particular piece of music content "borrows" portions of content from another work.

Further, the phrases "new music content," "novel music content," and "original music content" are not intended to encompass music content that is only trivially different from a pre-existing combination of musical elements. For example, merely changing a few notes of a pre-existing musical work does not result in new, novel, or original music content, as those phrases are used in the present disclosure. Similarly, merely changing a key or tempo or adjusting a relative strength of frequencies (e.g., using an equalizer interface) of a pre-existing musical work does not produce new, novel, or original music content. Moreover, the phrases, new, novel, and original music content are not intended to cover those pieces of music content that are borderline cases between original and non-original content; instead, these terms are intended to cover pieces of music content that are unquestionably and demonstrably original, including music content that would be eligible for copyright protection to the controlling entity (referred to herein as "protectable" music content). Further, as used herein, the term "available" music content refers to music content that does not violate copyrights of any entities other than the controlling entity. New and/or original music content is often protectable and available. This may be advantageous in preventing copying of music content and/or paying royalties for music content.

Although various embodiments discussed herein use rule-based engines, various other types of computer-implemented algorithms may be used for any of the computer learning and/or music generation techniques discussed herein. Rule-based approaches may be particularly effective in the music context, however.

Overview of Applications, Storage Elements, and Data that May be Used in Exemplary Music Systems A music generator module may interact with multiple different applications, modules, storage elements, etc. to generate music content. For example, end users may install one of multiple types of applications for different types of computing devices (e.g., mobile devices, desktop computers, DJ equipment, etc.). Similarly, another type of application may be provided to enterprise users. Interacting with applications while generating music content may allow the music generator to receive external information that it may use to determine target music attributes and/or update one or more rule sets used to generate music content. In addition to interacting with one or more applications, a music generator module may interact with other modules to receive rule sets, update rule sets, etc. Finally, a music generator module may access one or more rule sets, loops, and/or generated music content stored in one or more storage elements. In addition, a music generator module may store any of the items listed above in one or more storage elements, which may be local or accessed via a network (e.g., cloud-based).

FIG. 2 is a block diagram illustrating an exemplary overview of a system for generating output music content based on inputs from multiple different sources. In the illustrated embodiment, system 200 includes rule module 210, user application 220, web application 230, enterprise application 240, artist application 250, artist rule generator module 260, storage of generated music 270, and external inputs 280.

User application 220, web application 230, and enterprise application 240, in the illustrated embodiment, receive external inputs 280. In some embodiments, external inputs 280 include: environment inputs, target music attributes, user input, sensor input, etc. In some embodiments, user application 220 is installed on a user's mobile device and includes a graphical user interface (GUI) that allows the user to interact/communicate with rule module 210. In some embodiments, web application 230 is not installed on a user device, but is configured to run within a browser of a user device and may be accessed through a website. In some embodiments, enterprise application 240 is an application used by a larger-scale entity to interact with a music generator. In some embodiments, application 240 is used in combination with user application 220 and/or web application 230. In some embodiments, application 240 communicates with one or more external hardware devices and/or sensors to collect information concerning the surrounding environment.

Rule module 210, in the illustrated embodiment, communicates with user application 220, web application 230, and enterprise application 240 to produce output music content. In some embodiments, music generator 160 is included in rule module 210. Note that rule module 210 may be included in one of applications 220, 230, and 240 or may be installed on a server and accessed via a network. In some embodiments, applications 220, 230, and 240 receive generated output music content from rule module 210 and cause the content to be played. In some embodiments, rule module 210 requests input from applications 220, 230, and 240 regarding target music attributes and environment information, for example, and may use this data to generate music content.

Stored rule set(s) 120, in the illustrated embodiment, are accessed by rule module 210. In some embodiments, rule module 210 modifies and/or updates stored rule set(s) 120 based on communicating with applications 220, 230, and 240. In some embodiments, rule module 210 accesses stored rule set(s) 120 to generate output music content. In the illustrated embodiment, stored rule set(s) 120 may include rules from artist rule generator module 260, discussed in further detail below.

Artist application 250, in the illustrated embodiment, communicates with artist rule generator module 260 (which may be part of the same application or may be cloud-based, for example). In some embodiments, artist application 250 allows artists to create rule sets for their specific sound, e.g., based on previous compositions. This functionality is further discussed with reference to FIGS. 3-4 below. In some embodiments, artist rule generator module 260 is configured to store generated artist rule sets for use by rule module 210. Users may purchase rule sets from particular artists before using them to generate output music via their particular application. The rule set for a particular artist may be referred to as a signature pack.

Stored loop(s) and corresponding attribute(s) 110, in the illustrated embodiment, are accessed by module 210 when applying rules to select and combine tracks to generate output music content. In the illustrated embodiment, rule module 210 stores generated output music content in storage element 270.

In some embodiments, one or more of the elements of FIG. 2 are implemented on a server and accessed via a network, which may be referred to as a cloud-based implementation. For example, stored rule set(s) 120, loop(s)/attribute(s) 110, and generated music 270 may all be stored on the cloud and accessed by module 210. In another example, module 210 and/or module 260 may also be implemented in the cloud. In some embodiments, generated music 270 is stored in the cloud and digitally watermarked. This may allow detection of copying generated music, for example, as well as generating a large amount of custom music content.

In some embodiments, one or more of the disclosed modules are configured to generate other types of content in addition to music content. For example, the system may be configured to generate output visual content based on target music attributes, determined environmental conditions, currently-used rule sets, etc. For example, the system may search a database or the Internet based on current attributes of the music being generated and display a collage of images that dynamically changes as the music changes and matches the attributes of the music.

Exemplary Rule Set Generator Based on Previously-Composed Music

In some embodiments, a music generator is configured to generate output music content with a style similar to a known artist or a known style. In some embodiments, a rule set generator is configured to generate rule sets to facilitate such custom music. For example, a rule generator module may capture the particular style of an artist by using previously-composed music content from that artist to determine a rule set. Once a rule set has been determined for the artist, a music generator module may generate new music content unique to the style of that artist.

Figure 3:
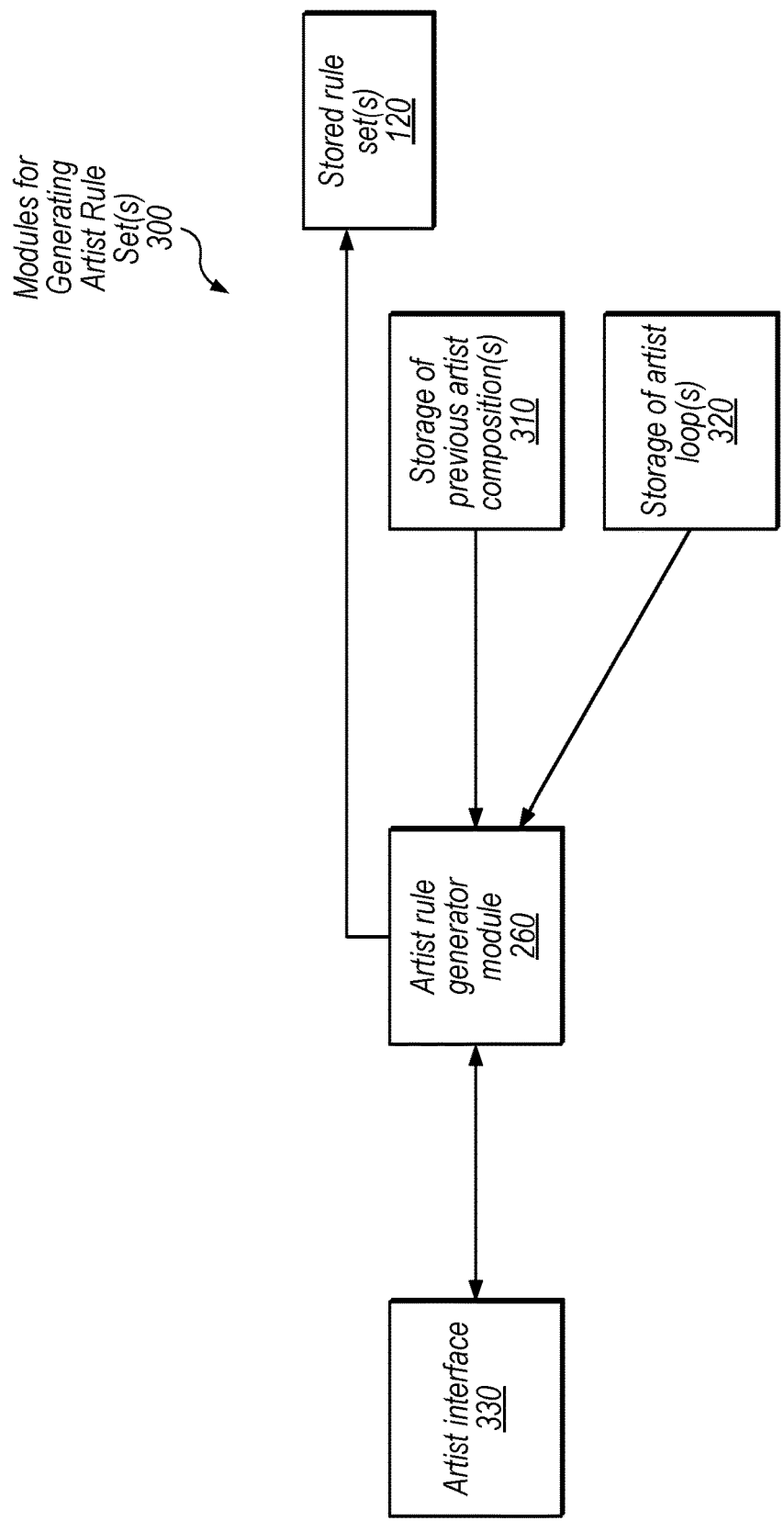
FIG. 3 is a block diagram illustrating an exemplary rule set generator that produces rules based on previously-composed music, according to some embodiments.

FIG. 3 is a block diagram illustrating an exemplary rule set generator that produces rules based on previously-composed music, according to some embodiments. In the illustrated embodiment, modules 300 includes storage of previous artist compositions 310, storage of artist loop(s) 320, and artist interface 330.

Artist rule generator module 260, in the illustrated embodiment, is configured to generate a rule set for a particular artist (or a particular theme or style of music, in other embodiments) and add the rule set to stored rule set(s) 120. In some embodiments, an artist uploads previous compositions 310 and/or artist loops 320 (e.g., loops that were used to create the previous compositions). In other embodiments, the artist may only upload previous compositions, without uploading corresponding loops. Uploading loops, however, may facilitate de-composing the previously-composed music to more accurately generate a rule set for the artist. Thus, in the illustrated embodiment, rule generator module 260 may access previous artist compositions 310 and artist loop(s) 320.

Artist composition(s) 310 may include all of the music content generated by one or more artists. Similarly, loop(s) 320 may include all or a portion of the loops used to generate composition(s) 310.

In some embodiments, artist rule generator module 260 separates one or more individual loops from artist composition(s) 310. In some embodiments, knowledge of loops 320 may improve the accuracy and reduce processing requirements for this decomposition. Based on the decomposition, rule generator module determines a set of rules for how the artist typically composes. In some embodiments, the determined set of rules is called an artist signature pack. For example, the rules may specify which instruments the artist typically combines together, how the artist typically changes keys, artist complexity and variety, etc. The rules may be binary (e.g., true or false) or may be determined statistically (e.g., 25% of the time artist A transitions from the key of A to the key of E, and 60% of the time artist A transitions from the key of A to the key of D). Based on statistical rules, a music generator may attempt to match the specified percentages over time.

In some embodiments, the artist may indicate, for previously-composed music, which music matches certain target music attributes. For example, some compositions may be high or low energy, high or low complexity, happy, sad, etc.

Based on this categorization and processing of the categorized compositions, rule generator module 260 may determine rules for how the artist typically composes for particular target attributes (e.g., artist A increases tempo to achieve greater energy while artist B may tend to add complexity).

Artist interface 330, in the illustrated embodiment, communicates with artist rule generator module 260. In some embodiments, module 260 requests input from the artist through interface 330. In some embodiments, the artist provides feedback, via interface 330, to the artist rule generator module 260. For example, module 260 may request feedback from the artist for one or more rules in the generated artist rule set. This may allow the artist to add additional rules, modify generated rules, etc. For example, the interface may display the rule that "25% of the time artist A transitions from the key of A to the key of E" and allow the artist to delete or change the rule (e.g., the artist could specify that this transition should occur 40% of the time). As another example, module 260 may request feedback from the artist confirming whether or not module 260 properly decomposed one or more loops from artist compositions 310.

In some embodiments, various elements of FIG. 3 may be implemented as part of the same application installed on the same device. In other embodiments, one or more elements of FIG. 3 may be stored separately from artist interface 330, e.g., on a server. Further, stored rule set(s) 120 may be provided via the cloud, e.g., such that users can download a rule set corresponding to a particular desired artist. As discussed above, a similar interface may be used to generate rule sets for themes or contexts that are not necessarily artist-specific.

Figure 4:
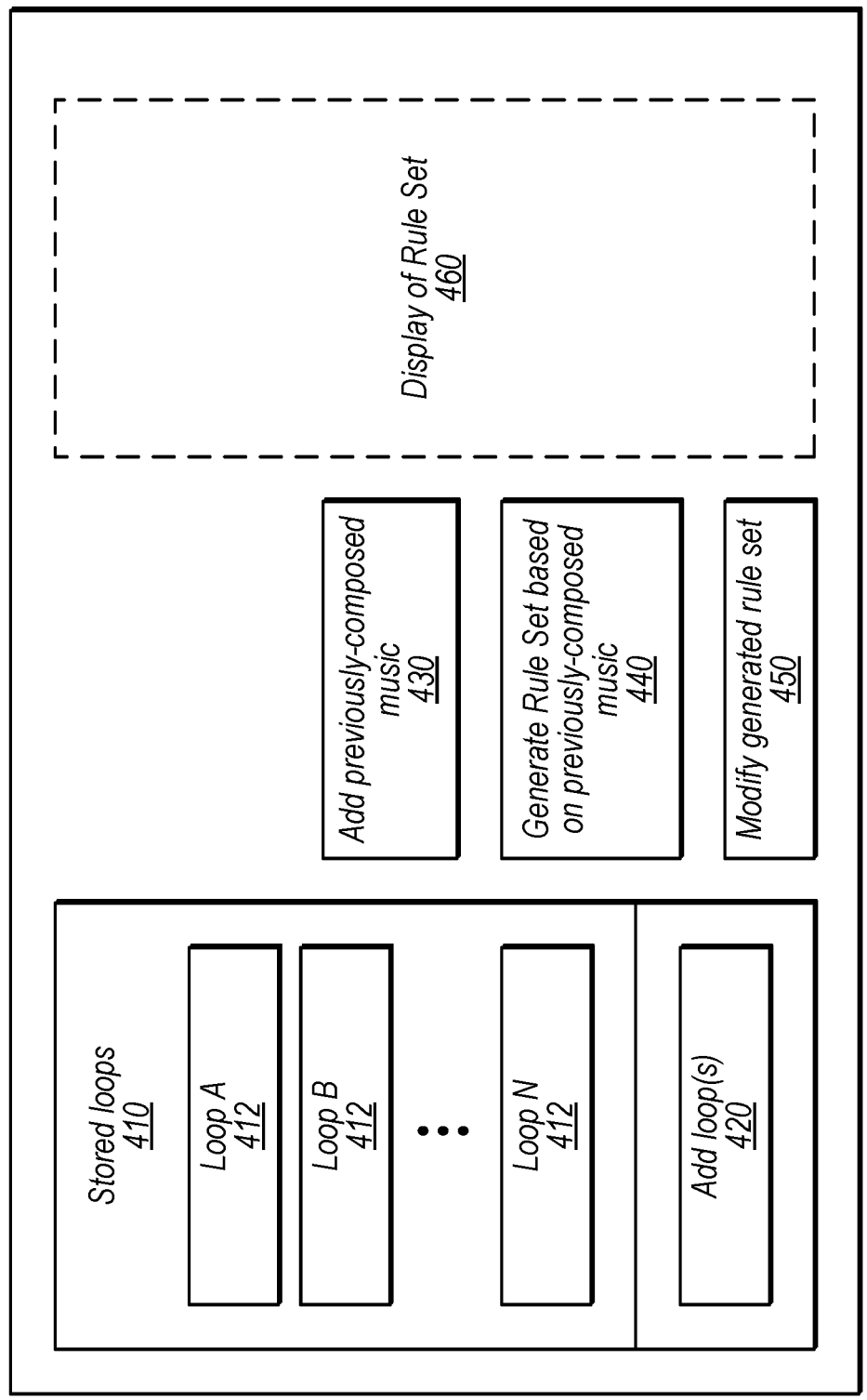
FIG. 4 is a block diagram illustrating an exemplary artist graphical user interface (GUI), according to some embodiments.

FIG. 4 is a block diagram illustrating an exemplary artist interface for generating an artist rule set, according to some embodiments. In the illustrated embodiment, graphical user interface (GUI) 400 includes stored loops 410, selection elements 420, 430, 440 and 450, and display 460. Note that the illustrated embodiment is an example embodiment of the artist interface 330 shown in FIG. 3.

In the illustrated embodiment, at least a portion of the stored loops 410 are displayed as loops A-N 412. In some embodiments, the loops are uploaded by the artist, e.g., to facilitate decomposition of the artist's music to determine a rule set. In some embodiments, the interface allows the artist to select one or more loops 412 from stored loops 410 to modify or delete. In the illustrated embodiment, selection element 420 allows the artist to add one or more loops to the list of stored loops 410.

Selection element 430, in the illustrated embodiment, allows the artist to add previously-composed music content. Selection of this element may cause display of another interface to upload and otherwise manage such content. In some embodiments, the interface may allow uploading of multiple different sets of music. This may allow the artist to create different rules sets for different styles of the same artist, for example. Further, this may allow the artist to upload previously-generated music that the artist believes is appropriate for certain target music attributes, which may facilitate automatic determination of rule set(s) for that artist. As another example, the interface may allow the artist to listen to prior music content and tag parts of the prior music content with target music attributes. For example, the artist may tag certain portions as higher-energy, lower variety, certain moods, etc., and the rule generator module 260 may use these tags as input to generate a rule set for the artist. Speaking generally, rule generator module 260 may implement any of various appropriate computer learning techniques to determine one or more rule sets.

In the illustrated embodiment, selection element 440 allows the artist to initiate determination of a rule set based on previously-composed music (e.g., added using element 430). In some embodiments, in response to artist selection of 440, the artist rule generator module analyzes and separates out loops from the previously-composed music. In some embodiments, the artist rule generator module generates a rule set for the artist based on the separated loops. In the illustrated embodiment, selection element 450 allows the artist to modify the generated artist rule set (e.g., which may open another GUI that displays determined rules and allows modification).

Display 460, in the illustrated embodiment, shows the artist their rule set (e.g., the original set and/or as modified by the artist). In other embodiments, display 460 may also display various other information disclosed herein.

In some embodiments, the rule set generator may generate a rule set for a particular user. For example, music that the user prefers may be de-composed to determine one or more rule sets for that particular user. The user preference may be based on explicit user input, listening history, indication of preferred artists, etc.

Figure 5:
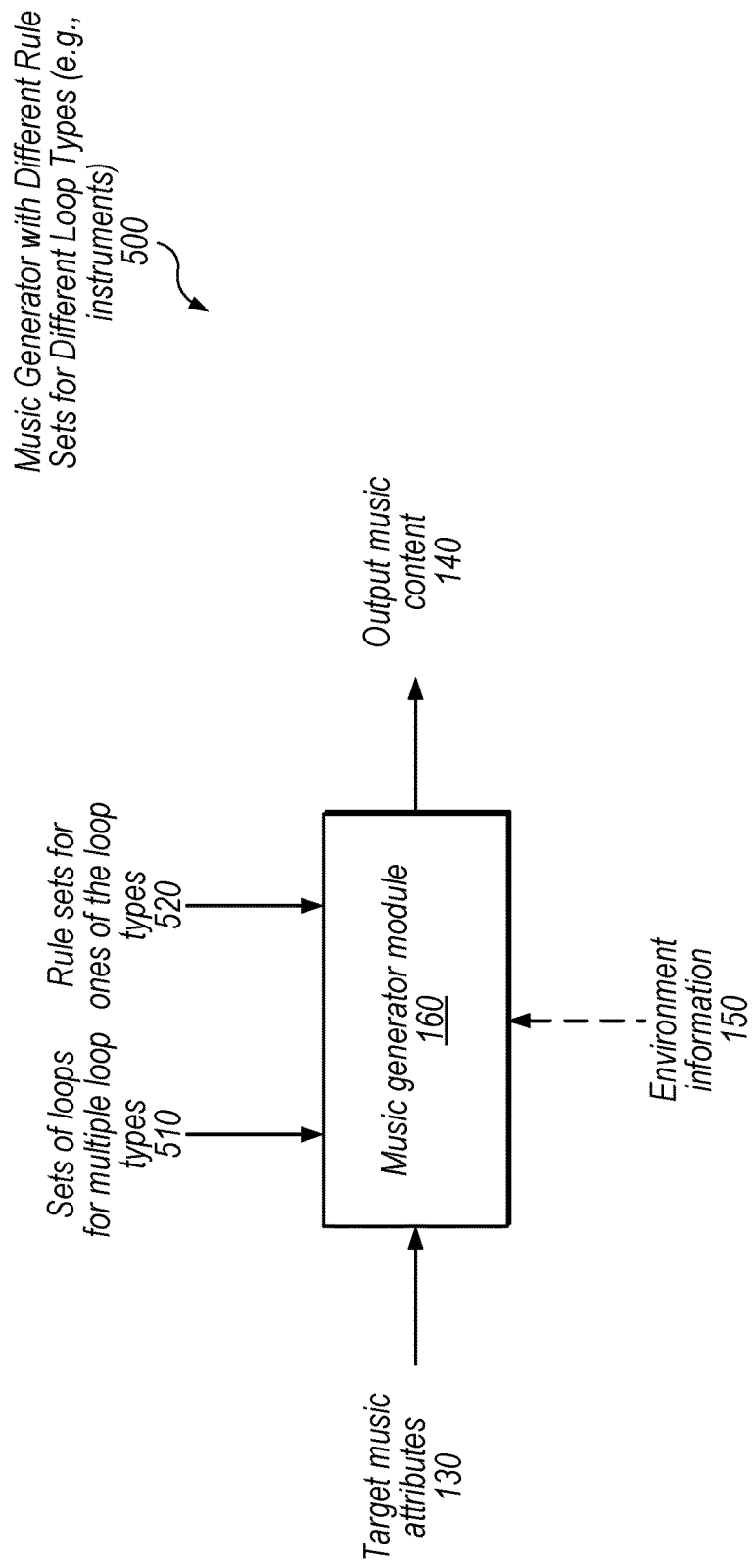
FIG. 5 is a diagram illustrating an exemplary music generator module that generates music content based on multiple different types of inputs, including rule sets for one or more different types of instruments, according to some embodiments.

Exemplary Music Generator Module with Different Rule Sets for Different Types of Loops FIG. 5 is a diagram illustrating a music generator module configured to access multiple sets of loops with multiple corresponding rule sets. In some embodiments, using multiple different rule sets (e.g., for different instruments) may provide greater variation, more accurate matching of music to target attributes, more similarity to real-life musicians, etc.

Information 510, in the illustrated embodiment, includes sets of loops for multiple loop types. Loops may be grouped into sets for the same instrument, same type of instrument, same type of sound, same mood, similar attributes, etc. Attributes of each loop may also be maintained, as discussed above.

Rule sets 520, in the illustrated embodiment, correspond to respective ones of the sets of loops and specify rules for selecting and/or combining those loops based on target music attributes 130 and/or environment information 150. These rule sets may coordinate similarly to artists in an improvisation session, by deciding what loops to select and when to join in. In some embodiments, one or more master rule sets may operate to select and/or combine outputs from the other rule sets.

Figure 6A:
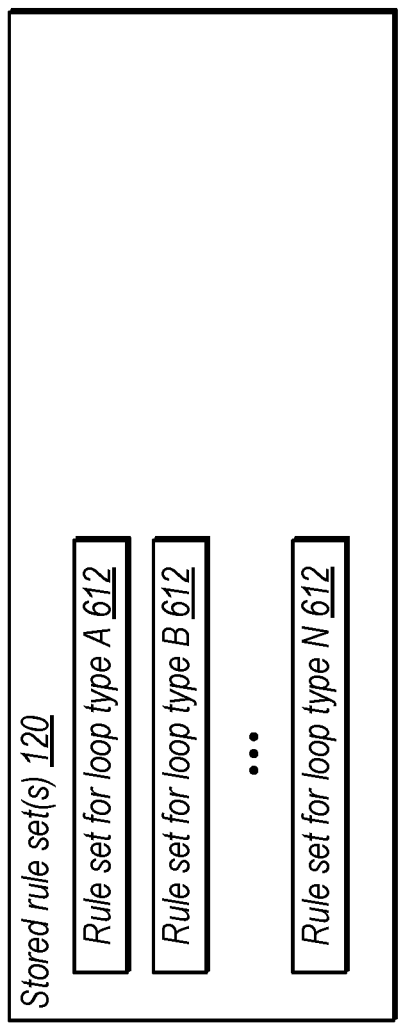
FIGS. 6A-6B are block diagrams illustrating exemplary stored rule sets, according to some embodiments.
Figure 6B:
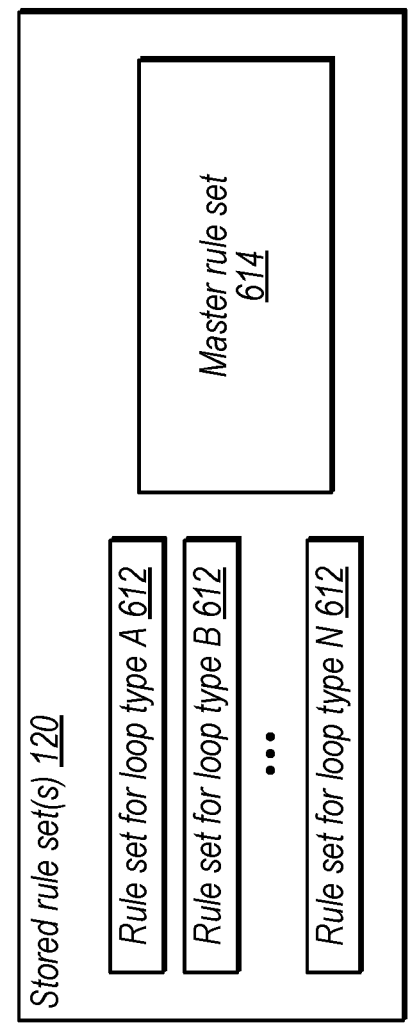

FIG. 6A is a block diagram illustrating multiple rule sets for different loop types A-N 612, according to some embodiments. FIG. 6B is a block diagram illustrating rule sets 612 for multiple loop sets and a master rule set 614.

For example, consider a set of loops for a certain type of drums (e.g., loop type A). The corresponding rule set 512 may indicate various loop parameters to prioritize when selecting loops based on target music attributes, such as tempo, pitch, complexity, etc. The corresponding rule set 612 may also indicate whether to provide drum loops at all (e.g., based on the desired energy level). Further, a master rule set 614 may determine a subset of selected loops from the drum rule set to actually incorporate into the output stream. For example, the master rule set 614 may select from among multiple sets of loops for different types of drums (such that some selected loops suggested by the corresponding rule sets may not actually be combined into the output music content 140). Similarly, the master rule set 614 may indicate never to include drum loops below a certain specified energy level or always to include one or more drum loops above another specified energy level, for example.

Further, the master rule set 614 may indicate the number of loop outputs selected by rule sets 612 to combine based on target music attributes. For example, if based on the target music attributes, seven rule sets decide to provide a loop from their corresponding loop sets (e.g., out of ten total rule sets because three of the rule sets decide not to provide loops at this time), the master rule set 614 may still select only five of the provided loops to combine (e.g., by ignoring or discarding loops from the other two rule sets). Further, the master rule set 614 may alter provided loops and/or add additional loops that are not provided by other rule sets.

In some embodiments, all of the rule sets have the same target musical attributes at a given time. In other embodiments, target musical attributes may be separately determined or specified for different rule sets. In these embodiments, a master rule set may be useful to avoid contention between the other rule sets.

Exemplary Music Generator for Video Content

Generating music content for video can be a long and tedious process. Applying rule-based machine learning using one or more rule sets may avoid this process and/or provide more relevant music content for a video. In some embodiments, the music generator uses video content as an input to one or more rule sets when selecting and combining loops. For example, the music generator may generate target music attributes based on the video data and/or use attributes of the video data directly as inputs to the rule set. Further, when generating a sound track for a video, different rule sets may be used for different audiences to produce a unique experience for each audience. Once the music generator has selected one or more rule sets and one or more loops to use for the video, the music generator produces music content and outputs the music content while the video is being viewed. Still further, a rule set may be adjusted in real-time, e.g., based on environment information associated with viewers of a video.

Figure 7:
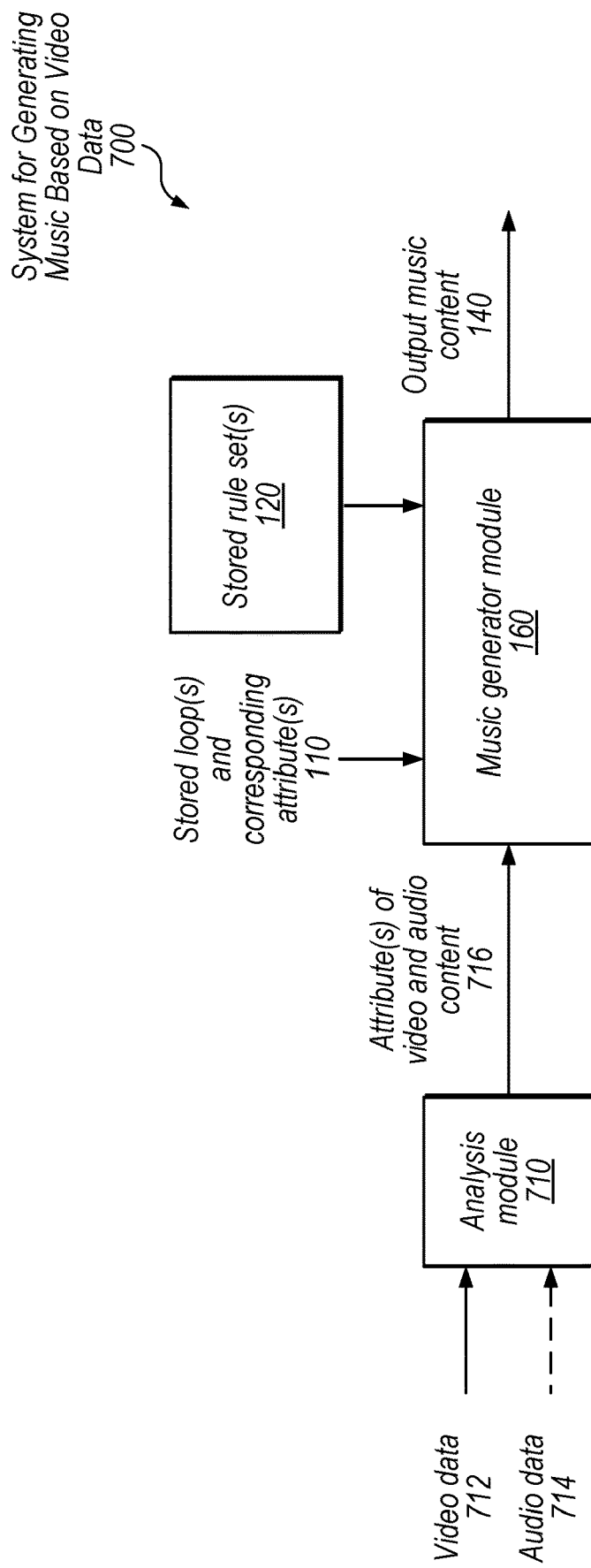
FIG. 7 is a block diagram illustrating an exemplary music generator module outputting music content for a video, according to some embodiments.

FIG. 7 is a block diagram illustrating an exemplary music generator module configured to output music content based on video data, according to some embodiments. In the illustrated embodiment, system 700 includes analysis module 710 and music generator module 160.

Analysis module 710, in the illustrated embodiment, receives video data 712 and audio data 714 corresponding to the video data. In some embodiments, analysis module 710 does not receive audio data 714 corresponding to video data 712, but is configured to generate music based on video data only. In some embodiments, analysis module 710 analyzes data 712 and data 714, identifying certain attributes of the data. In the illustrated embodiment, attribute(s) of video and audio content 716 are sent to music generator module 160.

Music generator module 160, in the illustrated embodiment, accesses stored loop(s), corresponding attribute(s) 110, and stored rule set(s) 120. In order to generate music content for the video, module 160 evaluates attribute(s) 716 and uses one or more rule sets to select and combine loops to generate output music content 140. In the illustrated embodiment, music generator module 160 outputs music content 140. In some embodiments, the music content 140 is generated by music generator module based on both video data 712 and audio data 714. In some embodiments, music content 140 is generated only based on video data 712.

In some embodiments, music content is generated as a soundtrack for a video. For example, a sound track may be generated for a video based on one or more video and/or audio attributes. In this example, one or more of the following video attributes from a video may be used to update a rule set for the video: tone of voice (e.g., whether a character in the video is angry), cultures (e.g., what accent, clothing, etc. are used in a scene), objects/props in a scene, color/darkness of a scene, frequency of switching between scenes, sound effects indicated by the audio data (e.g., explosions, conversations, movement sounds), etc. Note that the disclosed techniques may be used to generate music content for any type of video (e.g., a 30 second clip, a short film, a commercial, a still photo, a slideshow of still photos, etc.).

In another example, multiple different sound tracks are generated for one or more audiences. For example, music content may be generated for two different audiences based on the viewers age. For example, a first rule set may be applied that targets audiences of adults age 30 and above, while a second rule set may be applied that targets audiences of children age 16 and below. In this example, music content generated for the first audience may be more mature than the music content generated for the second audience. Similar techniques may be used to generate different music content for various different contexts, such as: different times of day, display equipment used to show the video, audio equipment available, countries of display, languages, etc.

Exemplary Music Generator for Video Content with Real-Time Updates to a Rule Set In some embodiments, generating music content for a video using rule-based machine learning may allow real-time adjustment of a rule set (e.g., that the music content is based on) based on environment information. This method of generating music content may produce different music for different audiences of the same video content.

Figure 8:
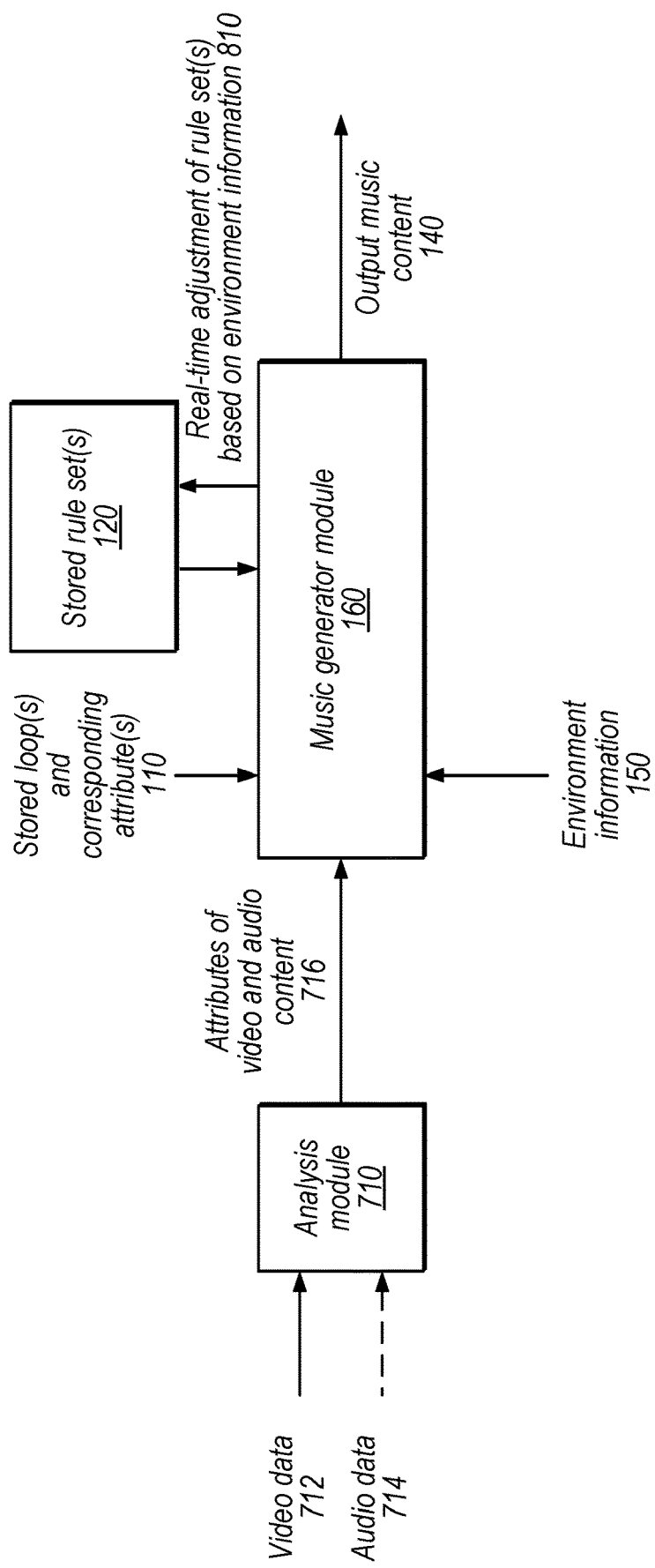
FIG. 8 is a block diagram illustrating an exemplary music generator module, outputting music content for a video in real-time, according to some embodiments.
Figure 9B:
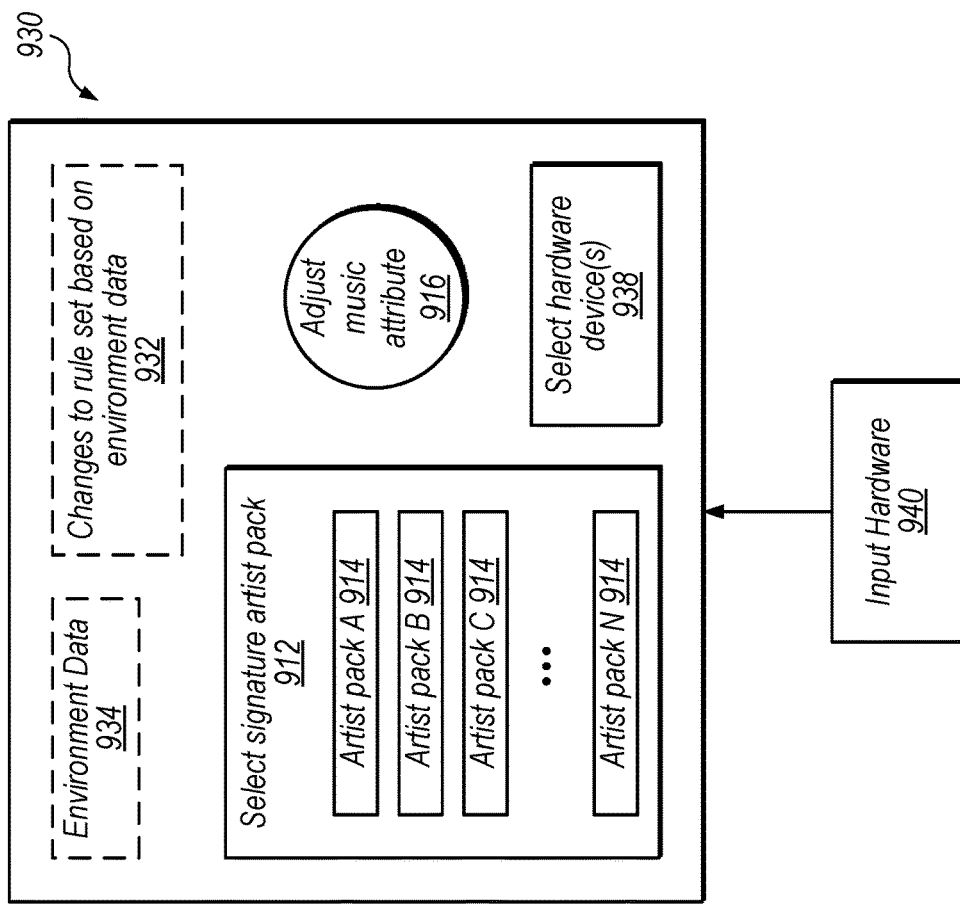
FIGS. 9A-9B are block diagrams illustrating exemplary graphical user interfaces, according to some embodiments.
Figure 9A:
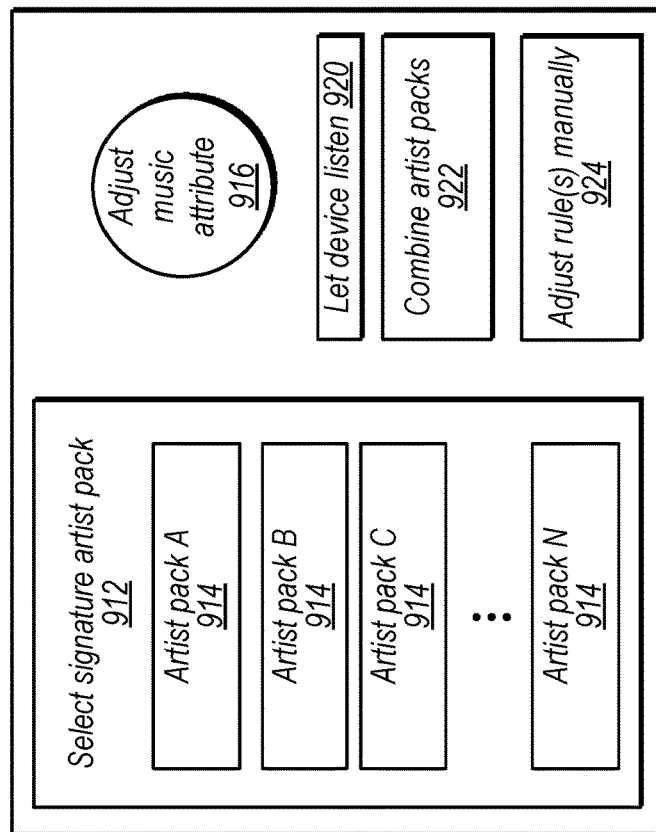

FIG. 8 is a block diagram illustrating an exemplary music generator module 160 configured to output music content for a video with real-time adjustments to a rule set, according to some embodiments.

Environment information 150, in the illustrated embodiment, is input to music generator module 160 during the display of a video. In the illustrated embodiment, the music generator module performs real-time adjustment of rule set(s) based on environment information 810. In some embodiments, environment information 150 is obtained from an audience watching a video. In some embodiments, information 150 includes one or more of the following: facial expression (e.g., frowning, smiling, attentiveness, etc.), physical movement (e.g., clapping, fidgeting, attentiveness, etc.), verbal expression (e.g., laughing, sighing, crying, etc.), demographic, age, lighting, ambient noise, number of viewers, etc.

In various embodiments, output music content 140 is played based on the adjusted rule set concurrently with the audience viewing the video. These techniques may generate unique music content for a video displayed to multiple different audiences at the same time. For example, two audiences in the same theater viewing the same video on different screens may hear entirely different music content. Similar applications of this example include different audiences on a plane, subway, sports bar, etc. Further, if users have a personal audio device (e.g., headphones), a custom soundtrack may be created for each individual user.

The disclosed techniques may also be used to emphasize particular desired emotions in an audience. For example, the goal of a horror film may be to scare the audience. Based on audience reactions, the rule set may be dynamically adjusted to increase intensity, fear, etc. Similarly, for sad/happy scenes, the rule set may be adjusted based on whether the target audience is actually sad or happy (e.g., with a goal to increase a desired emotion). In some embodiments, video producers may tag certain portions of their videos with certain target attributes which may be input to music generator module to more accurately produce a desired type of music. Speaking generally, in some embodiments, the music generator updates a rule set based on whether the attributes displayed by the audience correspond to previously-determined attributes of the video and/or audio content. In some embodiments, these techniques provide an adaptive audience feedback control loop in which audience feedback is used to update rule sets or target parameters.

In some embodiments, a video may be played for multiple audiences to adjust a rule-set in real time. The environment data may be recorded and used to select a final rule set (e.g., based on the rule sets for the audience(s) that most closely matched desired target audience attributes). This rule set may then be used to statically or dynamically generate music for the video, without real-time updates to the final rule set.

Exemplary User and Enterprise GUIs

FIGS. 9A-9B are block diagrams illustrating graphical user interfaces, according to some embodiments. In the illustrated embodiment, FIG. 9A contains a GUI displayed by user application 910 and FIG. 9B contains a GUI displayed by enterprise application 930. In some embodiments, the GUIs displayed in FIGS. 9A and 9B are generated by a website rather than by an application. In various embodiments, any of various appropriate elements may be displayed, including one or more of the following elements: dials (e.g., to control volume, energy, etc.), buttons, knobs, display boxes (e.g., to provide the user with updated information), etc.

In FIG. 9A, user application 910 displays a GUI that contains section 912 for selecting one or more artist packs. In some embodiments, packs 914 may alternatively or additionally include theme packs or packs for a specific occasion (e.g., a wedding, birthday party, graduation ceremony, etc.). In some embodiments, the number of packs shown in section 912 is greater than the number that can be displayed in section 912 at one time. Therefore, in some embodiments, the user scrolls up and/or down in section 912 to view one or more packs 914. In some embodiments, the user can select an artist pack 914 based on which he/she would like to hear output music content. In some embodiments, artist packs may be purchased and/or downloaded, for example.

Selection element 916, in the illustrated embodiment, allows the user to adjust one or more music attributes (e.g., energy level). In some embodiments, selection element 916 allows the user to add/delete/modify one or more target music attributes.

Selection element 920, in the illustrated embodiment, allows the user to let the device (e.g., mobile device) listen to the environment to determine target musical attributes. In some embodiments, the device collects information about the environment using one or more sensors (e.g., cameras, microphones, thermometers, etc.) after the user selects selection element 920. In some embodiments, application 910 also selects or suggests one or more artist packs based on the environment information collected by the application when the user selected element 920.

Selection element 922, in the illustrated embodiment, allows the user to combine multiple artist packs to generate a new rule set. In some embodiments, the new rule set is based on the user selecting one or more packs for the same artist. In other embodiments, the new rule set is based on the user selecting one or more packs for different artists. The user may indicate weights for different rule sets, e.g., such that a highly-weighted rule set has more effect on generated music than a lower-weighted rule set. The music generator may combine rule sets in multiple different ways, e.g., by switching between rules from different rule sets, averaging values for rules from multiple different rule sets, etc.

In the illustrated embodiment, selection element 924 allows the user to adjust rule(s) in one or more rule sets manually. For example, in some embodiments, the user would like to adjust the music content being generated at a more granular level, by adjusting one or more rules in the rule set used to generate the music content. In some embodiments, this allows the user of application 910 to be their own disk jockey (DJ), by using the controls displayed in the GUI in FIG. 9A to adjust a rule set used by a music generator to generate output music content. These embodiments may also allow more fine-grained control of target music attributes.

In FIG. 9B, enterprise application 930 displays a GUI that also contains an artist pack selection section 912 with artist packs 914. In the illustrated embodiment, the enterprise GUI displayed by application 930 also contains element 916 to adjust/add/delete one or more music attributes. In some embodiments, the GUI displayed in FIG. 9B is used in a business or storefront to generate a certain environment (e.g., for optimizing sales) by generating music content. In some embodiments, an employee uses application 930 to select one or more artist packs that have been previously shown to increase sales (for example, metadata for a given rule set may indicate actual experimental results using the rule set in real-world contexts).

Input hardware 940, in the illustrated embodiment, sends information to the application or website that is displaying enterprise application 930. In some embodiments, input hardware 940 is one of the following: a cash register, heat sensors, light sensors, a clock, noise sensors, etc. In some embodiments, the information sent from one or more of the hardware devices listed above is used to adjust target music attributes and/or a rule set for generating output music content for a specific environment. In the illustrated embodiment, selection element 938 allows the user of application 930 to select one or more hardware devices from which to receive environment input.

Display 934, in the illustrated embodiment, displays environment data to the user of application 930 based on information from input hardware 940. In the illustrated embodiment, display 932 shows changes to a rule set based on environment data. Display 932, in some embodiments, allows the user of application 930 to see the changes made based on the environment data.

In some embodiments, the elements shown in FIGS. 9A and 9B are for theme packs and/or occasion packs. That is, in some embodiments, the user or business using the GUIs displayed by applications 910 and 930 can select/adjust/modify rule sets to generate music content for one or more occasions and/or themes.

Detailed Example Music Generator System

Figure 10:
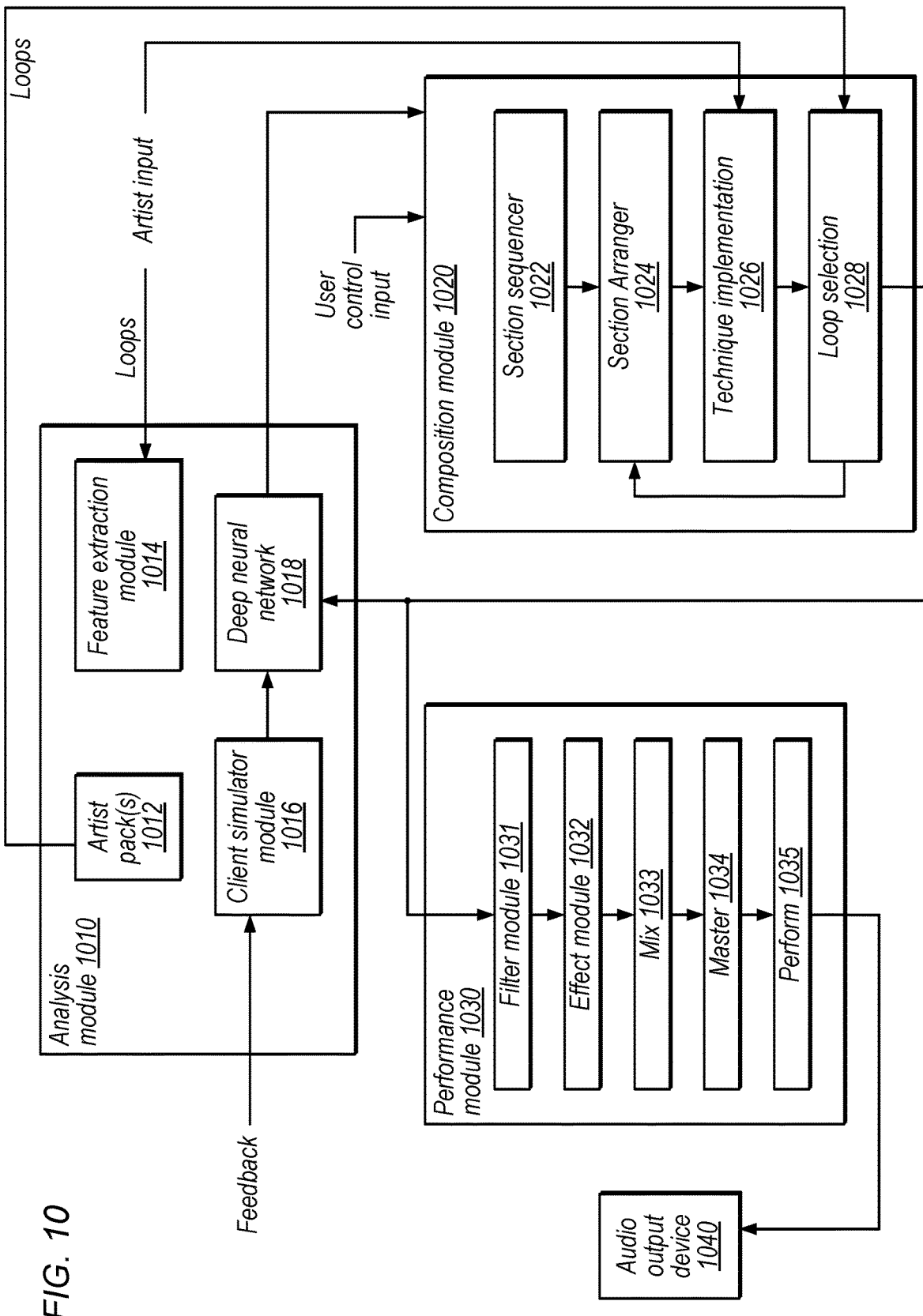
FIG. 10 is a block diagram illustrating an example music generator system that implements a neural network, according to some embodiments.
Figure 11:
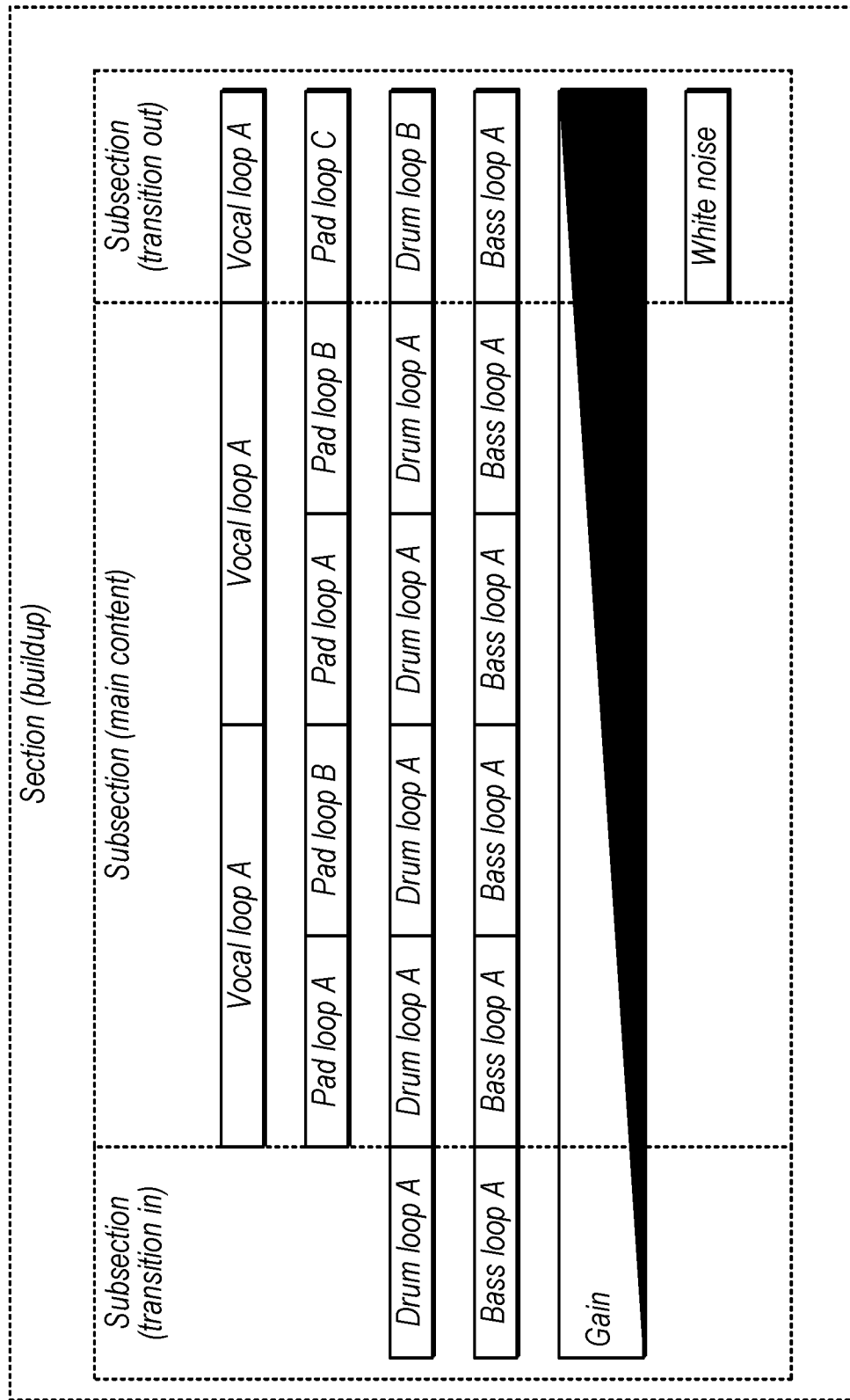
FIG. 11 is a diagram illustrating an example buildup section of music content, according to some embodiments.
Figure 12:
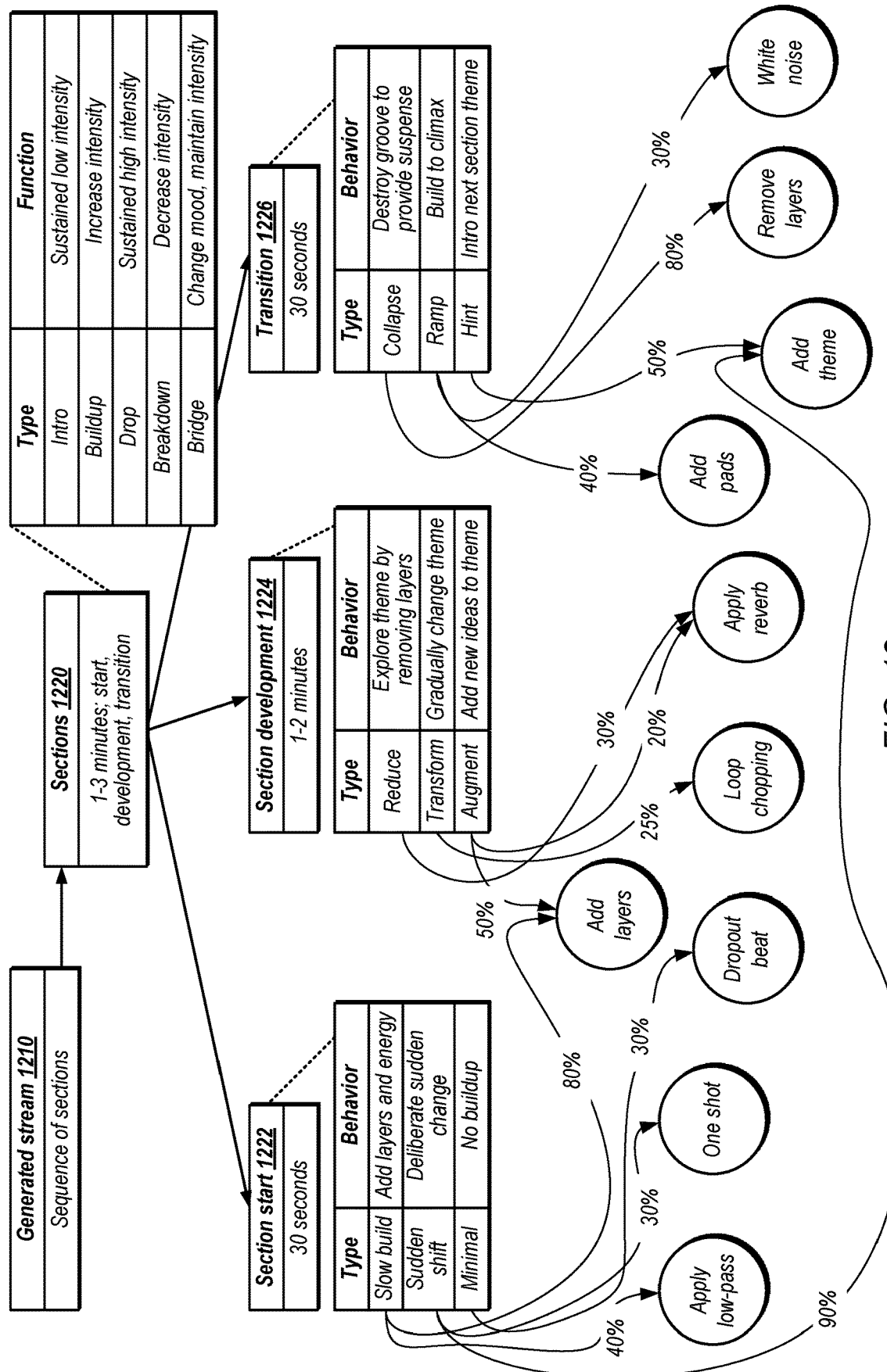
FIG. 12 is a diagram illustrating example techniques for arranging sections of music content, according to some embodiments.

FIGS. 10-12 show details regarding specific embodiments of music generator module 160. Note that although these specific examples are disclosed for purposes of illustration, they are not intended to limit the scope of the present disclosure. In these embodiments, construction of music from loops is performed by a client system, such as a personal computer, mobile device, media device, etc. Loops may be divided into professionally curated loop packs, which may be referred to as artist packs. Loops may be analyzed for music properties and the properties may be stored as loop metadata. Audio in constructed tracks may be analyzed (e.g., in real-time) and filtered to mix and master the output stream. Various feedback may be sent to the server, including explicit feedback such as from user interaction with sliders or buttons and implicit feedback, e.g., generated by sensors, based on volume changes, based on listening lengths, environment information, etc. In some embodiments, control inputs have known effects (e.g., to specify target music attributes directly or indirectly) and are used by the composition module.

The following discussion introduces various terms used with reference to FIGS. 10-12. In some embodiments, a loop library is a master library of loops, which may be stored by a server. Each loop may include audio data and metadata that describes the audio data. In some embodiments, a loop package is a subset of the loop library. A loop package may be a pack for a particular artist, for a particular mood, for a particular type of event, etc. Client devices may download loop packs for offline listening or download parts of loop packs on demand, e.g., for online listening.

A generated stream, in some embodiments, is data that specifies the music content that the user hears when they use the music generator system. Note that the actual output audio signals may vary slightly for a given generated stream, e.g., based on capabilities of audio output equipment.

A composition module, in some embodiments, constructs compositions from loops available in a loop package. The composition module may receive loops, loop metadata, and user input as parameters and may be executed by a client device. In some embodiments, the composition module outputs a performance script that is sent to a performance module and one or more machine learning engines. The performance script, in some embodiments, outlines which loops will be played on each track of the generated stream and what effects will be applied to the stream. The performance script may utilize beat-relative timing to represent when events occur. The performance script may also encode effect parameters (e.g., for effects such as reverb, delay, compression, equalization, etc.).

A performance module, in some embodiments, receives a performance script as input and renders it into a generated stream. The performance module may produce a number of tracks specified by the performance script and mix the tracks into a stream (e.g., a stereo stream, although the stream may have various encodings including surround encodings, object-based audio encodings, multi-channel stereo, etc. in various embodiments). In some embodiments, when provided with a particular performance script, the performance module will always produce the same output.

An analytics module, in some embodiments, is a server-implemented module that receives feedback information and configures the composition module (e.g., in real-time, periodically, based on administrator commands, etc.). In some embodiments, the analytics module uses a combination of machine learning techniques to correlate user feedback with performance scripts and loop library metadata.

FIG. 10 is a block diagram illustrating an example music generator system that includes analysis and composition modules, according to some embodiments. In some embodiments, the system of FIG. 10 is configured to generate a potentially-infinite stream of music with direct user control over the mood and style of music. In the illustrated embodiment, the system includes analysis module 1010, composition module 1020, performance module 1030, and audio output device 1040. In some embodiments, analysis module 1010 is implemented by a server and composition module 1020 and performance module 1030 are implemented by one or more client devices. In other embodiments, modules 1010, 1020, and 1030 may all be implemented on a client device or may all be implemented server-side.

Analysis module 1010, in the illustrated embodiment, stores one or more artist packs 1012 and implements a feature extraction module 1014, a client simulator module 1016, and a deep neural network 1018.

In some embodiments, feature extraction module 1014 adds loops to a loop library after analyzing loop audio (although note that some loops may be received with metadata already generated and may not require analysis). For example, raw audio in a format such as way, aiff, or FLAC may be analyzed for quantifiable musical properties such as instrument classification, pitch transcription, beat timings, tempo, file length, and audio amplitude in multiple frequency bins. Analysis module 1010 may also store more abstract musical properties or mood descriptions for loops, e.g., based on manual tagging by artists or machine listening. For example, moods may be quantified using multiple discrete categories, with ranges of values for each category for a given loop.

Consider, for example, a loop A that is analyzed to determine that the notes G2, Bb2, and D2 are used, the first beat begins 6 milliseconds into the file, the tempo is 122 bpm, the file is 6483 milliseconds long, and the loop has normalized amplitude values of 0.3, 0.5, 0.7, 0.3, and 0.2 across five frequency bins. The artist may label the loop as "funk genre" with the following mood values:

| Transcendence | Peacefulness | Power | Joy | Sadness | Tension |
|---|---|---|---|---|---|
| HIGH | HIGH | LOW | MEDIUM | NONE | LOW |

Analysis module 110 may store this information in a database and clients may download subsections of the information, e.g., as loop packages. Although artists packs 1012 are shown for purposes of illustration, analysis module 1010 may provide various types of loop packages to composition module 1020.

Client simulator module 1016, in the illustrated embodiment, analyzes various types of feedback to provide feedback information in a format supported by deep neural network 1018. In the illustrated embodiment, the deep neural network 1018 also receives performance scripts generated by composition modules as inputs. In some embodiments, the deep neural network configures the composition module based on these inputs, e.g., to improve correlations between types of generated music output and desired feedback. For example, the deep neural network may periodically push updates to client devices implementing composition module 1020. Note that deep neural network 1018 is shown for purposes of illustration and may provide strong machine learning performance in disclosed embodiments, but is not intended to limit the scope of the present disclosure. In various embodiments, various types of machine learning techniques may be implemented alone or in various combinations to perform similar functionality. Note that machine learning modules may be used to implement rule sets (e.g., arrangement rules or techniques) directly in some embodiments or may be used to control modules implementing other types of rule sets, e.g., using deep neural network 1018 in the illustrated embodiment.

In some embodiments, analysis module 1010 generates composition parameters for composition module 1020 to improve correlation between desired feedback and use of certain parameters. For example, actual user feedback may be used to adjust composition parameters, e.g., to attempt to reduce negative feedback.

As one example, consider a situation where module 1010 discovers a correlation between negative feedback (e.g., explicit low rankings, low volume listening, short listening times, etc.) and compositions that use a high number of layers. In some embodiments, module 1010 uses a technique such as backpropagation to determine that adjusting probability parameters used to add more tracks reduces the frequency of this issue. For example, module 1010 may predict that reducing a probability parameter by 50% will reduce negative feedback by 8% and may determine to perform the reduction and push updated parameters to the composition module (note that probability parameters are discussed in detail below, but any of various parameters for statistical models may similarly be adjusted).

As another example, consider a situation where module 1010 discovers that negative feedback is correlated with the user setting mood control to high tension. A correlation between loops with low tension tags and users asking for high tension may also be found. In this case, module 1010 may increase a parameter such that the probability of selecting loops with high tension tags is increased when users ask for high tension music. Thus, the machine learning may be based on various information, including composition outputs, feedback information, user control inputs, etc.

Composition module 1020, in the illustrated embodiment, includes a section sequencer 1022, section arranger 1024, technique implementation module 1026, and loop selection module 1028. In some embodiments, composition module 1020 organizes and constructs sections of the composition based on loop metadata and user control input (e.g., mood control).

Section sequencer 1022, in some embodiments, sequences different types of sections. In some embodiments, section sequencer 1022 implements a finite state machine to continuously output the next type of section during operation. For example, composition module 1020 may be configured to use different types of sections such as an intro, buildup, drop, breakdown, and bridge, as discussed in further detail below with reference to FIG. 12. Further, each section may include multiple subsections that define how the music changes throughout a section, e.g., including a transition-in subsection, a main content subsection, and a transition-out subsection.

Section arranger 1024, in some embodiments, constructs subsections according to arranging rules. For example, one rule may specify to transition-in by gradually adding tracks. Another rule may specify to transition-in by gradually increasing gain on a set of tracks. Another rule may specify to chop a vocal loop to create a melody. In some embodiments, the probability of a loop in the loop library being appended to a track is a function of the current position in a section or subsection, loops that overlap in time on another track, and user input parameters such as a mood variable (which may be used to determine target attributes for generated music content). The function may be adjusted, e.g., by adjusting coefficients based on machine learning.

Technique implementation module 1020, in some embodiments, is configured to facilitate section arrangement by adding rules, e.g., as specified by an artist or determined by analyzing compositions of a particular artist. A "technique" may describe how a particular artist implements arrangement rules at a technical level. For example, for an arrangement rule that specifies to transition-in by gradually adding tracks, one technique may indicate to add tracks in order of drums, bass, pads, then vocals while another technique may indicate to add tracks in order of bass, pads, vocals, then drums. Similarly, for an arrangement rule that specifies to chop a vocal loop to create a melody a technique may indicate to chop vocals on every second beat and repeat a chopped section of loop twice before moving to the next chopped section.

Loop selection module 1028, in the illustrated embodiment, selects loops according to the arrangement rules and techniques, for inclusion in a section by section arranger 1024. Once sections are complete, corresponding performance scripts may be generated and sent to performance module 1030. Performance module 1030 may receive performance script portions at various granularities. This may include, for example, an entire performance script for a performance of a certain length, a performance script for each section, a performance script for each sub-section, etc. In some embodiments, arrangement rules, techniques, or loop selection are implemented statistically, e.g., with different approaches used different percentages of the time.

Performance module 1030, in the illustrated embodiment, includes filter module 1031, effect module 1032, mix module 1033, master module 1034, and perform module 1035. In some embodiments, these modules process the performance script and generate music data in a format supported by audio output device 1040. The performance script may specify the loops to be played, when they should be played, what effects should be applied by module 1032 (e.g., on a per-track or per-subsection basis), what filters should be applied by module 1031, etc.

For example, the performance script may specify to apply a low pass filter ramping from 1000 to 20000 Hz from 0 to 5000 milliseconds on a particular track. As another example, the performance script may specify to apply reverb with a 0.2 wet setting from 5000 to 15000 milliseconds on a particular track.

Mix module 1033, in some embodiments, is configured to perform automated level control for the tracks being combined. In some embodiments, mix module 1033 uses frequency domain analysis of the combined tracks to measure frequencies with too much or too little energy and applies gain to tracks in different frequency bands to even the mix. Master module 1034, in some embodiments, is configured to perform multi-band compression, equalization (EQ), or limiting procedures to generate data for final formatting by perform module 1035. The embodiment of FIG. 10 may automatically generate various output music content according to user input or other feedback information, while the machine learning techniques may allow for improved user experience over time.

FIG. 11 is a diagram illustrating an example buildup section of music content, according to some embodiments. The system of FIG. 10 may compose such a section by applying arranging rules and techniques. In the illustrated example, the buildup section includes three subsections and separate tracks for vocals, pad, drum, bass, and white noise.

The transition in subsection, in the illustrated example, includes a drum loop A, which is also repeated for the main content subsection. The transition in subsection also includes a bass loop A. As shown, the gain for the section begins low and increases linearly throughout the section (although non-linear increases or decreases are contemplated). The main content and transition-out subsection, in the illustrated example, include various vocal, pad, drum, and bass loops. As described above, disclosed techniques for automatically sequencing sections, arranging sections, and implementing techniques may generate near-infinite streams of output music content based on various user-adjustable parameters.

In some embodiments, a computer system displays an interface similar to FIG. 11 and allows artists to specify techniques used to compose sections. For example, artists may create structures such as shown in FIG. 11 which may be parsed into code for the composition module.

FIG. 12 is a diagram illustrating example techniques for arranging sections of music content, according to some embodiments. In the illustrated embodiment, a generated stream 1210 includes multiple sections 1220 that each include a start subsection 1222, development subsection 1224, and transition subsection 1226. In the illustrated example, multiple types of each section/subsection are show in tables connected via dotted lines. The circular elements, in the illustrated embodiment, are examples of arranging tools, which may further be implemented using specific techniques as discussed below. As shown, various composition decisions may be performed pseudo-randomly according to statistical percentages. For example, the types of subsections, the arranging tools for a particular type or subsection, or the techniques used to implement an arranging tool may be statistically determined.

In the illustrated example, a given section 1220 is one of five types: intro, buildup, drop, breakdown, and bridge, each with different functions that control intensity over the section. The state sub-section, in this example, is one of three types: slow build, sudden shift, or minimal, each with different behavior. The development sub-section, in this example, is one of three types, reduce, transform, or augment. The transition sub-section, in this example, is one of three types: collapse, ramp, or hint. The different types of sections and subsections may be selected based on rules or may be pseudo-randomly selected, for example.

In the illustrated example, the behaviors for different subsection types are implemented using one or more arranging tools. For a slow build, in this example, 40% of the time a low pass filter is applied and 80% of the time layers are added. For a transform development sub-section, in this example, 25% of the time loops are chopped. Various additional arranging tools are shown, including one-shot, dropout beat, apply reverb, add pads, add theme, remove layers, and white noise. These examples are included for purposes of illustration and are not intended to limit the scope of the present disclosure. Further, to facilitate illustration, these examples may not be complete (e.g., actual arranging may typically involve a much larger number of arranging rules).

In some embodiments, one or more arranging tools may be implemented using specific techniques (which may be artist specified or determined based on analysis of an artist's content). For example, one-shot may be implemented using sound-effects or vocals, loop chopping may be implemented using stutter or chop-in-half techniques, removing layers may be implemented by removing synth or removing vocals, white noise may be implemented using a ramp or pulse function, etc. In some embodiments, the specific technique selected for a given arranging tool may be selected according to a statistical function (e.g., 30% of the time removing layers may remove synths and 70% of the time it may remove vocals for a given artist). As discussed above, arranging rules or techniques may be determined automatically by analyzing existing compositions, e.g., using machine learning.

Example Method

Figure 13:
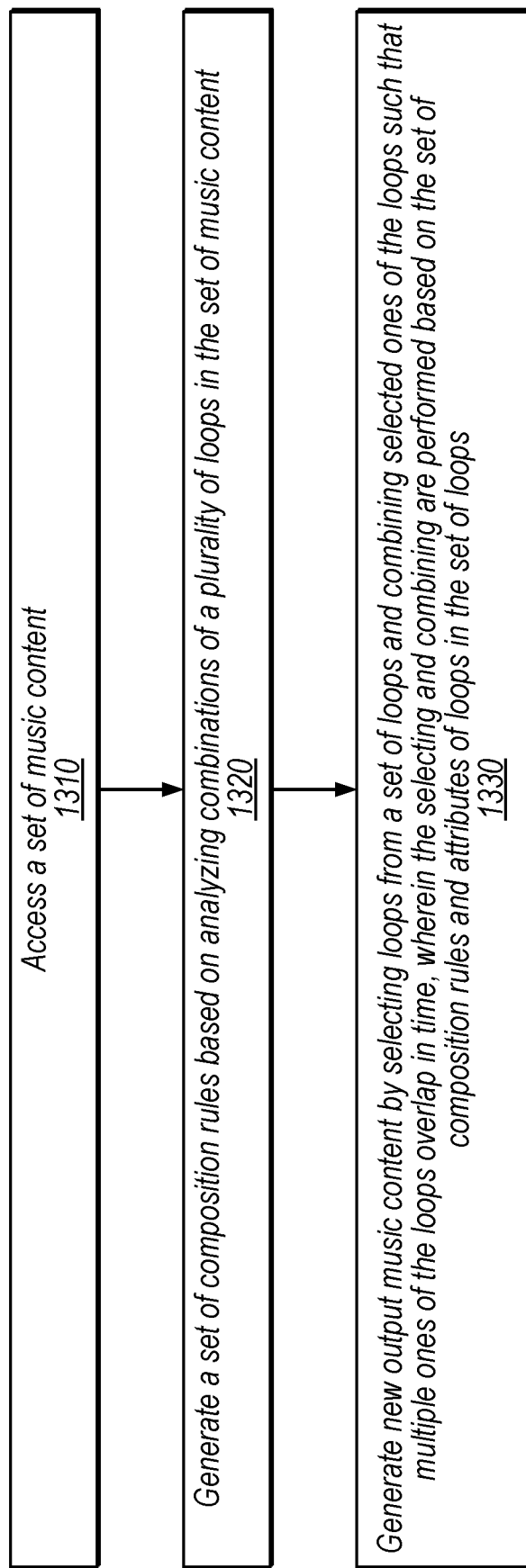
FIG. 13 is a flow diagram illustrating an example method for automatically generating music content, according to some embodiments.

FIG. 13 is a flow diagram illustrating a method for generating output music content, according to some embodiments. The method shown in FIG. 13 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 1310, in the illustrated embodiment, a computer system accesses a set of music content. For example, the set of music content may be an album, song, complete works, etc. of a particular artist. As another example, the set of music content may be associated with a particular genre, type of event, mood, etc.

At 1320, in the illustrated embodiment, the system generates a set of composition rules based on analyzing combinations of a plurality of loops in the set of music content. The composition rules may be specified statistically and may utilize random or pseudo-random procedures to satisfy statistical indicators. The loops may be provided explicitly for the set of music content or the system may break down the set of music content to determine the loops. In some embodiments, in addition to or in place of direct artist input to technique implementation module 1026, analysis module 1010 may generate techniques used to compose the set of music content (which may also be referred to as a rule set or a grammar) and composition module 1020 may use the techniques to generate new music content. In some embodiments, arranging rules may be determined at element 1320.

At 1330, in the illustrated embodiment, the system generates new output music content by selecting loops from a set of loops and combining selected ones of the loops such that multiple ones of the loops overlap in time, wherein the selecting and combining are performed based on the set of composition rules and attributes of loops in the set of loops. Note different devices of the computing system may generate the output music content and generate composition rules, in some embodiments. In some embodiments, a client device generates the output music content based on parameters provided by a server system (e.g., generated by deep neural network 1018).

In some embodiments, generating the new output music content includes modifying one or more of the selected loops. For example, the system may cut loops, apply filters to loops, etc.

In some embodiments, the loop selection and combining are performed based on target music attributes, e.g., user control input to composition module 1020. In some embodiments, various system parameters may be adjusted based on environment information. For example, the system may adjust the rules/techniques/grammars themselves based on environment information or other feedback information (e.g., using a machine learning engine such as deep neural network 1018). As another example, the system may adjust or weight target attributes based on environment information.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A non-transitory computer-readable medium having instructions stored thereon that are executable by a computing device to perform operations comprising:
   generating output music content by combining multiple musical tracks such that two or more of the tracks overlap in time, wherein the generating is performed by a composition module based on statistical rules for:
      selecting tracks to add to the output music content, wherein at least one statistical rule indicates a first type of track is to be included in a specified ratio within the output music content;
      determining a number of tracks to layer in the output music content, wherein at least one statistical rule indicates a first number of tracks to layer at a specified ratio within the output music content; and
      determining a next section type for the output music content from among a plurality of section types, wherein different section types have different statistical rules for selecting tracks and determining a number of tracks to layer; and
   adjusting one or more parameters for the statistical rules used by the composition module, wherein the adjusting is based on outputs of a machine learning module that receives feedback information as input, wherein the feedback information is associated with the output music content.

2. The non-transitory computer-readable medium of claim 1, wherein the machine learning module is executed by a server and wherein the computing device receives the adjustments to the one or more parameters via a wide area network.

3. The non-transitory computer-readable medium of claim 2, wherein the operations further comprise:
   sending a performance script representing the output music content to the server, wherein the machine learning module also receives the performance script as an input.

4. The non-transitory computer-readable medium of claim 1, wherein the machine learning module is a neural network.

5. The non-transitory computer-readable medium of claim 1,
   wherein the generating is further based on three or more of the following statistical rules:
      selecting gain level of tracks;
      transitioning into or out of sections;
      selecting one or more types of instruments;
      selecting one or more parameters for chopping vocal tracks;
      selecting one or more low pass filter parameters; and
      selecting one or more reverb parameters;
      selecting one or more white noise parameters; and
      selecting a tempo; and
   wherein the determining the next section type is performed from among at least three of the following section types:
      intro, build-up, drop, breakdown, and bridge.

6. The non-transitory computer-readable medium of claim 1, wherein the feedback information includes the following types of information:
   explicit user input;
   user listening behavior; and
   environment information.

7. The non-transitory computer-readable medium of claim 1, wherein the plurality of types include at least the following: buildup, drop, breakdown, and bridge.

8. The non-transitory computer-readable medium of claim 7, wherein the buildup section type is associated with a learned statistical rule for adding layers, a breakdown section is associated with a learned statistical rule for removing layers, and at least one section type is associated with a learned statistical rule for chopping selected tracks.

9. The non-transitory computer-readable medium of claim 1, further comprising adjusting one or more of the statistical rules based on user feedback.

10. The non-transitory computer-readable medium of claim 1, wherein the operations further comprise:
    processing, by a performance module, a performance script generated by the composition module to generate a representation of the output music content recognized by an audio output device.

11. The non-transitory computer-readable medium of claim 1, wherein the operations further comprise:
    operating the machine learning module to generate the outputs based on the feedback information.

12. A method, comprising:
    operating, by a computing system, a machine learning module to generate outputs based on output music content generated by a composition module and feedback information associated with the output music content; and
    generating, by the computing system based on the outputs, adjustments to one or more parameters for statistical rules used by the composition module, wherein the statistical rules include rules for:
       selecting tracks to add to the output music content, wherein at least one statistical rule indicates a first type of track is to be included in a specified ratio within the output music content;
       determining a number of tracks to layer in the output music content, wherein at least one statistical rule indicates a first number of tracks to layer at a specified ratio within the output music content; and
       determining a next section type for the output music content from among a plurality of section types, wherein different section types have different statistical rules for selecting tracks and determining a number of tracks to layer.

13. The method of claim 12, wherein the feedback information is associated with multiple different user devices and the output music content is generated by composition modules of multiple different user devices.

14. The method of claim 13, further comprising:
    periodically generating, by the computing system, the adjustments to the one or more parameters and transmitting the adjustments to the multiple different user devices.

15. The method of claim 13, wherein the machine learning module further generates the outputs based on one or more performance scripts for the output music content.

16. The method of claim 13, wherein the adjusted one or more parameters are one or more coefficients to a statistical function.

17. The method of claim 13, wherein the feedback information includes the following types of information:
- explicit user input;
- user listening behavior; and
- environment information.

18. The method of claim 13, wherein the operating the machine learning module affects correlation between desired feedback information and user input regarding desired music attributes for the output music content.

19. The method of claim 13, further comprising:
- operating, by the computing system, the composition module to generate the output music content.

20. An apparatus, comprising:
- one or more processors; and
- one or more memories having program instructions stored thereon that are executable by the one or more processors to:
  - generate output music content by combining multiple musical tracks such that two or more of the tracks overlap in time, wherein the generation is performed by a composition module based on statistical rules for:
    - select tracks to add to the output music content, wherein at least one statistical rule indicates a first type of track is to be included in a specified ratio within the output music content;
    - determine a number of tracks to layer in the output music content, wherein at least one statistical rule indicates a first number of tracks to layer at a specified ratio within the output music content; and
    - determine a next section type for the output music content from among a plurality of section types, wherein different section types have different statistical rules for selecting tracks and determining a number of tracks to layer; and
  - adjust one or more parameters for the statistical rules used by the composition module, wherein the adjustment is based on outputs of a machine learning module that receives feedback information content as input, wherein the feedback information is associated with the output music content.

* * * * *